(12) United States Patent
Bruck

(10) Patent No.: US 10,279,712 B2
(45) Date of Patent: May 7, 2019

(54) REAR ROW SEAT LATCH ASSEMBLY WITH POWER AND MANUAL DRIVEN VARIANTS

(71) Applicant: BAE Industries, Inc., Auburn Hills, MI (US)

(72) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 138 days.

(21) Appl. No.: 15/648,511

(22) Filed: Jul. 13, 2017

(65) Prior Publication Data
US 2018/0015850 A1 Jan. 18, 2018

Related U.S. Application Data

(60) Provisional application No. 62/396,558, filed on Sep. 19, 2016, provisional application No. 62/362,476, filed on Jul. 14, 2016.

(51) Int. Cl.
*B60N 2/30* (2006.01)
*B60N 2/02* (2006.01)
*B60N 2/874* (2018.01)

(52) U.S. Cl.
CPC ......... *B60N 2/3013* (2013.01); *B60N 2/0232* (2013.01); *B60N 2/874* (2018.02); *B60N 2002/024* (2013.01); *B60N 2002/0236* (2013.01)

(58) Field of Classification Search
CPC .... B60N 2/3013; B60N 2/874; B60N 2/0232; B60N 2002/0236; B60N 2002/024
USPC ......................................... 297/378.12, 378.1
See application file for complete search history.

(56) References Cited

U.S. PATENT DOCUMENTS

| | | | |
|---|---|---|---|
| 3,382,527 A | 5/1968 | Strien et al. | |
| 4,337,978 A * | 7/1982 | Kazaoka | B60N 2/2352 297/367 R |
| 4,781,416 A | 11/1988 | Johnson et al. | |
| 5,163,735 A | 11/1992 | Aljundi | |
| 5,322,346 A * | 6/1994 | Notta | B60N 2/2352 297/362 |
| 5,433,507 A * | 7/1995 | Chang | B60N 2/2352 297/354.12 |
| 5,788,330 A * | 8/1998 | Ryan | B60N 2/2354 297/367 R |
| 6,033,022 A * | 3/2000 | Bauer | B60N 2/20 297/378.12 |

(Continued)

FOREIGN PATENT DOCUMENTS

| | | |
|---|---|---|
| EP | 260849 A2 | 3/1988 |
| JP | 5309026 B2 | 10/2013 |

*Primary Examiner* — Mark R Wendell
(74) *Attorney, Agent, or Firm* — Dinsmore & Shohl, LLP

(57) ABSTRACT

The present invention discloses a seatback latch assembly integrated into an interface between a seatback pivotally supported to a seat bottom. The assembly includes a pair of floor supported stanchions defining a package receiving space therebetween. A seatback sector forms a portion of the seatback and is pivotally secured between the stanchions within the package space for rotation between upright design and forward folded positions. A cam is pivotally supported within the package space between the stanchions and so that an abutment edge of the cam engages a shoulder location of the seatback sector in the upright design position. The cam is influenced to a disengaged position, resulting in rotation of the seatback to the folded position.

18 Claims, 22 Drawing Sheets

(56) References Cited

U.S. PATENT DOCUMENTS

| | | |
|---|---|---|
| 6,805,650 B2 | 10/2004 | Branov et al. |
| 7,134,724 B2 * | 11/2006 | Chabanne ............ B60N 2/2352 297/366 |
| 7,661,760 B2 | 2/2010 | Nakaya et al. |
| 7,775,594 B2 | 8/2010 | Bruck et al. |
| 7,871,127 B2 * | 1/2011 | Bruck ..................... B60N 2/20 297/378.11 |
| 8,056,981 B2 | 11/2011 | Kojima et al. |
| 8,388,067 B2 | 3/2013 | Hida et al. |
| 8,585,148 B2 | 11/2013 | Yamada et al. |
| 8,746,773 B2 | 6/2014 | Bruck |
| 8,864,210 B2 | 10/2014 | Bruck |
| 8,985,691 B2 | 3/2015 | Tsuruta et al. |
| 9,022,479 B2 | 5/2015 | Hellrung et al. |
| 9,290,115 B2 | 3/2016 | Lutzka et al. |
| 2002/0089224 A1 * | 7/2002 | Bruck ................. B60N 2/2352 297/378.11 |
| 2002/0089225 A1 * | 7/2002 | Bruck ................. B60N 2/2352 297/378.11 |
| 2004/0056523 A1 * | 3/2004 | Grable ................ B60N 2/0284 297/378.12 |
| 2005/0046261 A1 * | 3/2005 | Grable ................ B60N 2/2354 297/378.1 |
| 2006/0061183 A1 * | 3/2006 | White ................ B60N 2/01583 297/378.12 |
| 2007/0126272 A1 | 6/2007 | Deptolla |
| 2007/0182231 A1 * | 8/2007 | Lutzka .............. B60N 2/01583 297/378.12 |
| 2007/0236067 A1 * | 10/2007 | Nathan ............... B60N 2/0224 297/378.12 |
| 2008/0231103 A1 | 9/2008 | Rohee |
| 2009/0008980 A1 * | 1/2009 | Schmitz ................. B60N 2/20 297/378.1 |
| 2009/0079248 A1 | 3/2009 | Keyser et al. |
| 2010/0026073 A1 * | 2/2010 | Bruck ................. B60N 2/0232 297/378.1 |
| 2010/0308634 A1 | 12/2010 | Narita et al. |
| 2011/0084531 A1 | 4/2011 | Hida et al. |
| 2012/0248841 A1 | 10/2012 | Hellrung et al. |
| 2013/0026806 A1 | 1/2013 | Yamada et al. |
| 2013/0320735 A1 * | 12/2013 | McCulloch .......... B60N 2/2358 297/362 |
| 2014/0125096 A1 * | 5/2014 | Barzen ................ B60N 2/2356 297/216.13 |

\* cited by examiner

REAR ROW SEAT LATCH ASSEMBLY WITH POWER AND MANUAL DRIVEN VARIANTS

CROSS REFERENCE TO RELATED APPLICATIONS

The present application claims the priority of U.S. Ser. No. 62/362,476, filed Jul. 14, 2016, as well as U.S. Ser. No. 62/396,558 filed Sep. 19, 2016.

BACKGROUND OF THE INVENTION

Field of the Invention

A rear row seat latch assembly having a pivotally supported seatback. In a first variant, a motor and pinion drive gear is mounted to the pivotal seatback sector arm and, upon disengaging a pivotal cam secured to a floor supported mounting plate upon which the seatback sector is pivotally mounted, results in the seatback being power driven to a forward rotating dump position. The pinion drive gear is bi-directionally rotatable for rewinding the seatback arm to the upright position, via a pair of overlapping fixed and rotatable outer teethed sectors which is engaged by the pinion gear.

A non-motorized/manual variant discloses a first biased and pivotal cam release bracket, to which is pivotally slaved via a pair of overlapping slots configured in the floor secured sector and the pivotal cam release bracket, a variant of the pivotal cam engaged to the seatback sector arm. Upon disengaging the cam from the seatback sector arm, a main pivot clock spring influences the seatback to the dump position.

Background of the Invention

The prior art is documented with examples of forward dump and power rewind of a seatback, such as associated with a rear row vehicle seat. A first example of this is depicted in U.S. Pat. No. 7,775,594 to Bruck et al. and which teaches a power seat assembly with motor actuated release and rewind of a seatback sector.

First and second support plates sandwich a forwardly biased seatback sector and a cam engaged with the seatback sector in an upright position. A first pin extends from said cam offset its pivotal connection and passes through a slot defined in the second support plate to define a range of pivotal motion of the cam. A toothed gear sector rotatably mounted to an exterior of the second support plates and exhibits a polygonal shaped portion as well as an end shoulder offset and inwardly recessed from exteriorly defined teeth and the polygonal shaped portion.

An electric motor includes an output gear in toothed engagement with the gear sector and for rotating the gear sector in a first direction so that the polygonal shaped portion contacts and deflects the pin and cam out of contact with the seatback, causing it to rotate to a forward dump position. A second pin extends from the seatback sector and contacts the end shoulder at the dump position, the motor rotating the gear sector in a second direction and forcibly rewinding the seatback sector, against its bias, to the upright design position coinciding with the cam re-engaging the seatback sector.

Other prior art examples include the seat latch assemblies of Bruck U.S. Pat. Nos. 8,864,210 and 8,746,773 for providing manual triggering and subsequent power rewinding of a seatback. A vertical support stanchion is secured to a floor location of a vehicle frame and an arm is pivotally supported at a lower end to an upper location of the stanchion.

In the instance of the '210 patent, the arm engages along a side location of a frame forming a portion of the seatback in a first upper design position. A lever and trigger initiates forward rotating dump of the seatback. An arrangement of linkage members are also located upon the inboard side of the stanchion for providing upright rewinding of the seatback and for subsequently resetting the linkage mechanism through the driving action of a motor operable drive shaft associated with lowermost pivotal mounting location of the stanchion support.

In the further instance of the '773 patent, the sector engages along a side location of a frame forming a portion of the seatback in a first upper design position. A lever and trigger initiates forward rotating dump of the seatback. A plurality of four linkage members are also located upon the stanchion and, in combination with a motor, provide upright rewinding of the seatback and subsequent resetting of the linkage mechanism.

SUMMARY OF THE PRESENT INVENTION

The present invention discloses a seatback latch assembly integrated into an interface between a seatback pivotally supported to a seat bottom. The assembly includes a pair of floor supported stanchions defining a package receiving space therebetween. A seatback sector forms a portion of the seatback and is pivotally secured between the stanchions within the package space for rotation between upright design and forward folded positions.

A cam is pivotally supported within the package space between the stanchions and so that an abutment edge of the cam engages a shoulder location of the seatback sector in the upright design position. The cam is influenced to a disengaged position, resulting in rotation of the seatback to the folded position.

Additional features include a selected one of the floor supported stanchions further having a plurality of exteriorly disposed teeth, a gear drive plate being pivotally supported in the package space in stacked fashion with the seatback sector, the gear drive plate exhibiting a second plurality of exteriorly disposed teeth which overlap the first plurality of teeth. A motor is secured to the sector arm and includes a pinion drive gear which engages the overlapping pluralities of teeth, the pinion gear rotating the gear plate a first rotational range in order to fold a remote situated headrest, with continued rotation of the pinion gear driving the seatback sector along the first plurality of teeth to the folded position. A cable extends from the gear drive plate such that, upon initial rotation of the plate by the pinion gear, a remote end of the cable in engagement with the headrest causing folding thereof.

An arcuate slot is defined in the seatback sector, a pin extending between the stanchions and through the slot to define a range of rotation between the upright design and forward folded positions. An elongated cam release bracket is pivotally secured to an exterior surface of an inner spaced stanchion, a cable displaced actuation of a first extending end of the cam release bracket causing a second end of the release bracket, in engagement with the package space situated pivot cam, to actuate the pivot cam out of engagement with the seatback sector.

A clock spring is supported about a main pivot established between the seatback sector and the outer stanchion plates for influencing the seatback to the forward folded position.

A pair of overlapping and arcuate slots are configured within each of a selected stanchion plate and the elongated release bracket, a cam release pin extending from the package spaced situated pivoting cam and through the overlapping slots. A torsion spring is mounted over a pivot point of the cam release bracket for biasing the pivot cam to the upright design engaged position against the seat seatback sector.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
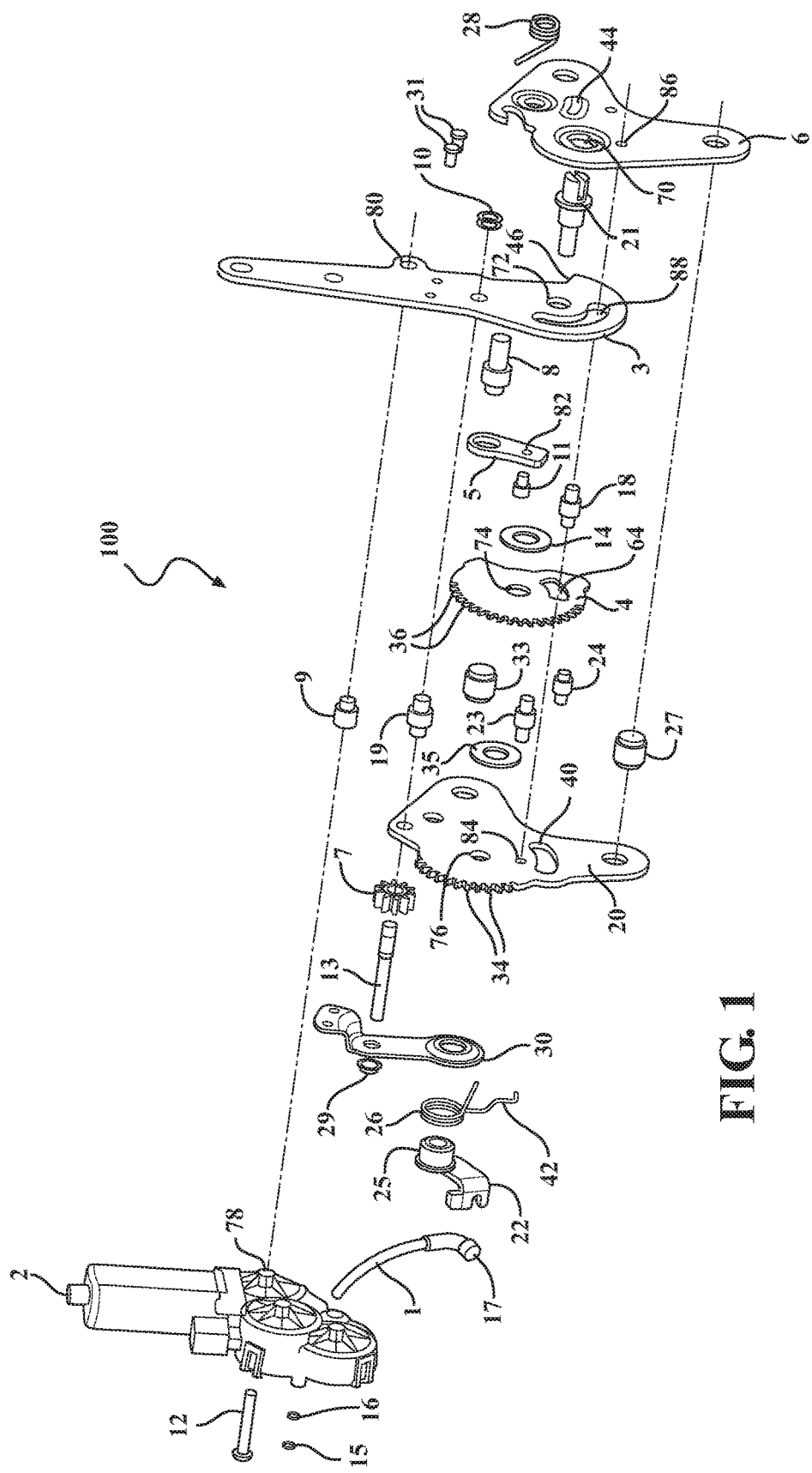
FIG. 1 is an exploded build of material perspective view of the rear row seat latch assembly according to a first power driven variant.
Figure 15:
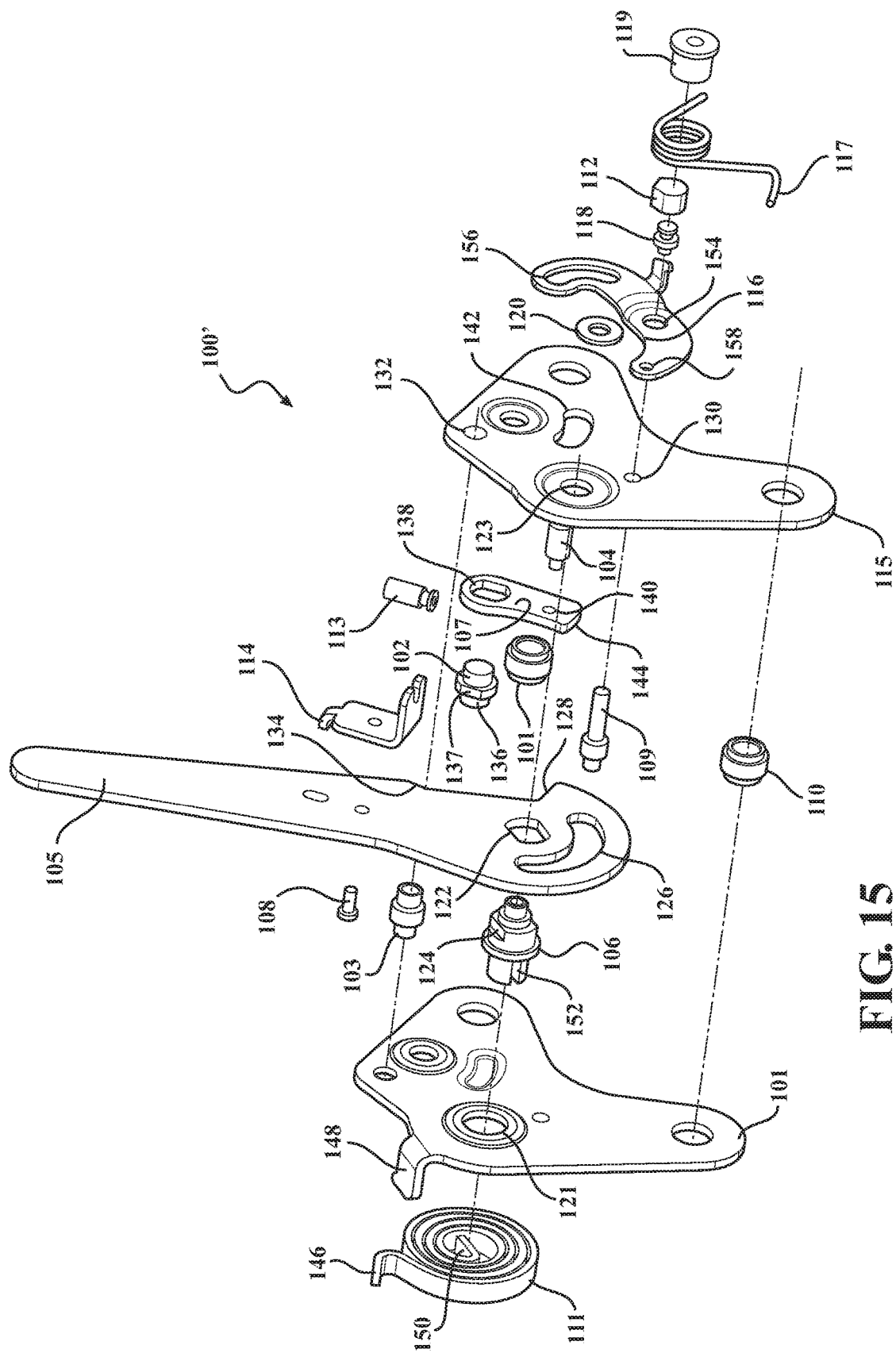
FIG. 15 is an exploded build of material perspective view of the rear row seat latch assembly according to a second manual variant.

With referenced to the attached illustrations, the present inventions disclose related variants of a rear row seat latch assembly, see as generally shown at 100 in the build out exploded perspective view of FIG. 1 and at 100' in the similar view of FIG. 15, both of which having a pivotally supported seatback biased in a forward dump fashion. It is understood that the variants depicted herein are understood to provide non-limiting examples of seatback assemblies within the scope of the present inventions.

Figure 2:
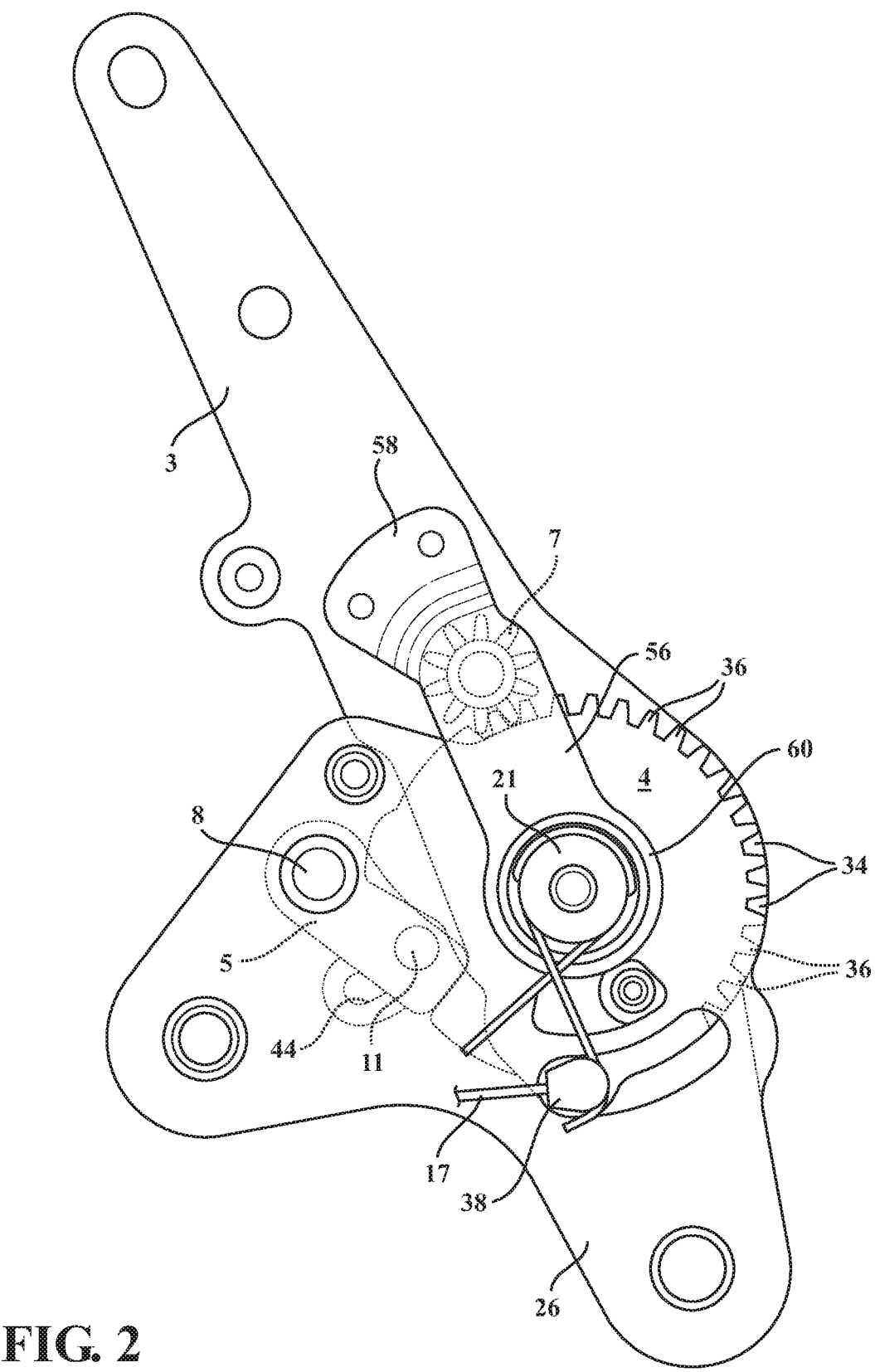
FIG. 2 is a side plan illustration of an initial upright design position associated with the seatback latch assembly according to FIG. 1.
Figure 3:
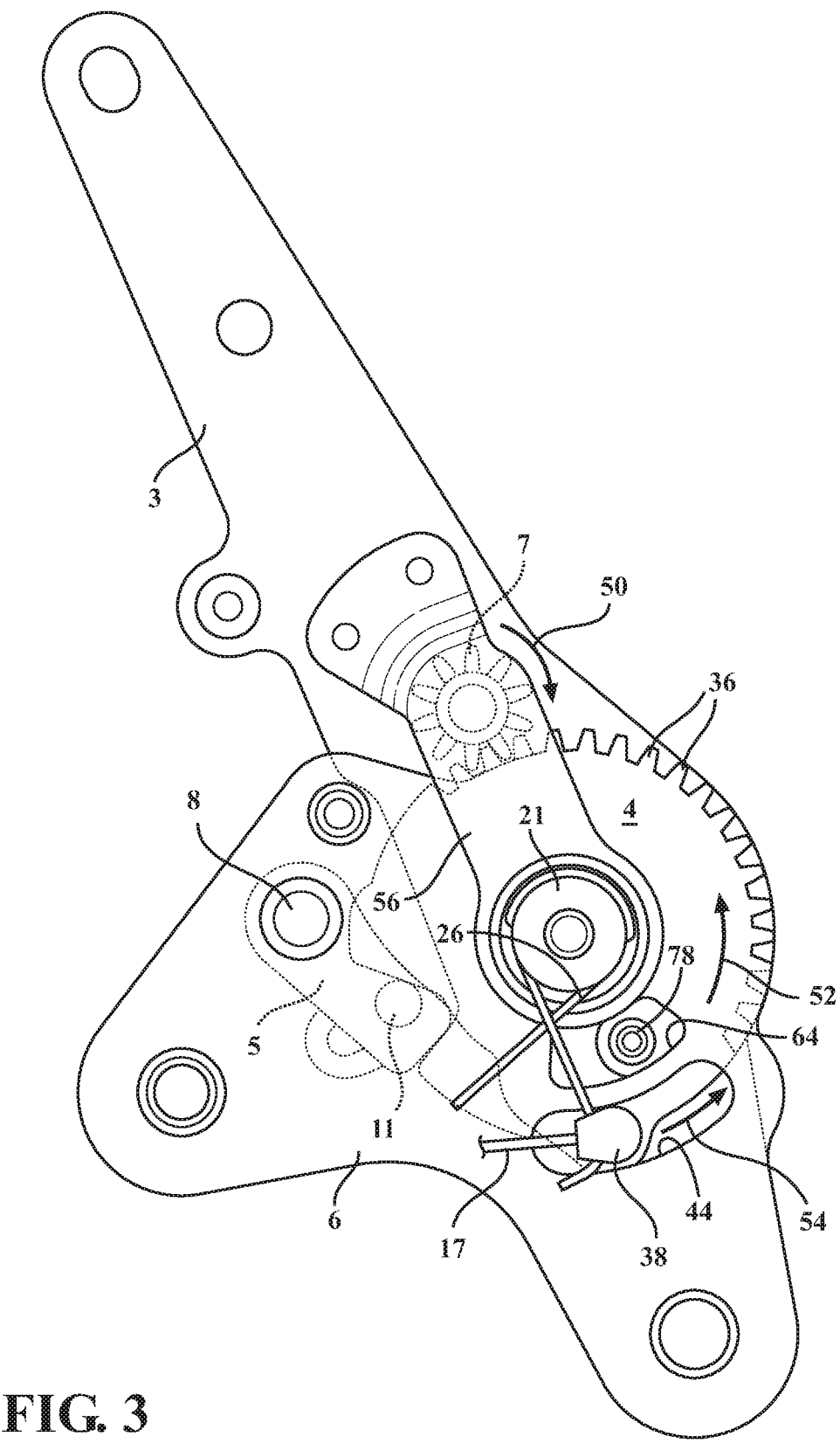
FIG. 3 is a succeeding illustration to FIG. 2 depicting an initial cam disengagement motion initiated by rotation of the motor pinion gear relative to the overlapping fixed and rotatable teethed sectors.

Referring first to the variant of FIGS. 1-14, the package assembly as described herein is incorporated into a pivot location established between a pivotally supporting seatback frame portion, identified as an arm sector 3 in FIG. 1, and a pair of inner 6 and outer 20 fixed floor supported plates or sectors. As will be further described with additional reference to FIGS. 2-14, the outer selected and fixed plate 20 exhibits a toothed exterior profile, at 34, which corresponds in overlapping fashion with a similar toothed profile 36 associated with the rotatable and gear drive sector 4. As shown in FIG. 2, each of the inner plate 6, seatback arm sector 3, gear drive sector 4, and outer plate 20 each include overlapping main pivot locations (see aligning apertures 70 in inner plate 6, at 72 in seatback sector 3, at 74 in gear drive sector 4 and at 76 in outer plate 20), through which inserts a main pivot pin 21 such that the arm sector 3 and gear drive sector 4 are sandwiched between the inner 6 and outer 20 plates.

A series of spacer rivets and bushings, see at 19 and 27, are provided for mounting the inner 6 and outer 20 plates in a desired spatial arrangement for packaging the interior assembly components. A bushing 10 secures over a portion of the spacer rivet 19 projecting through a mounting aperture in the sector arm 3.

Figure 10:
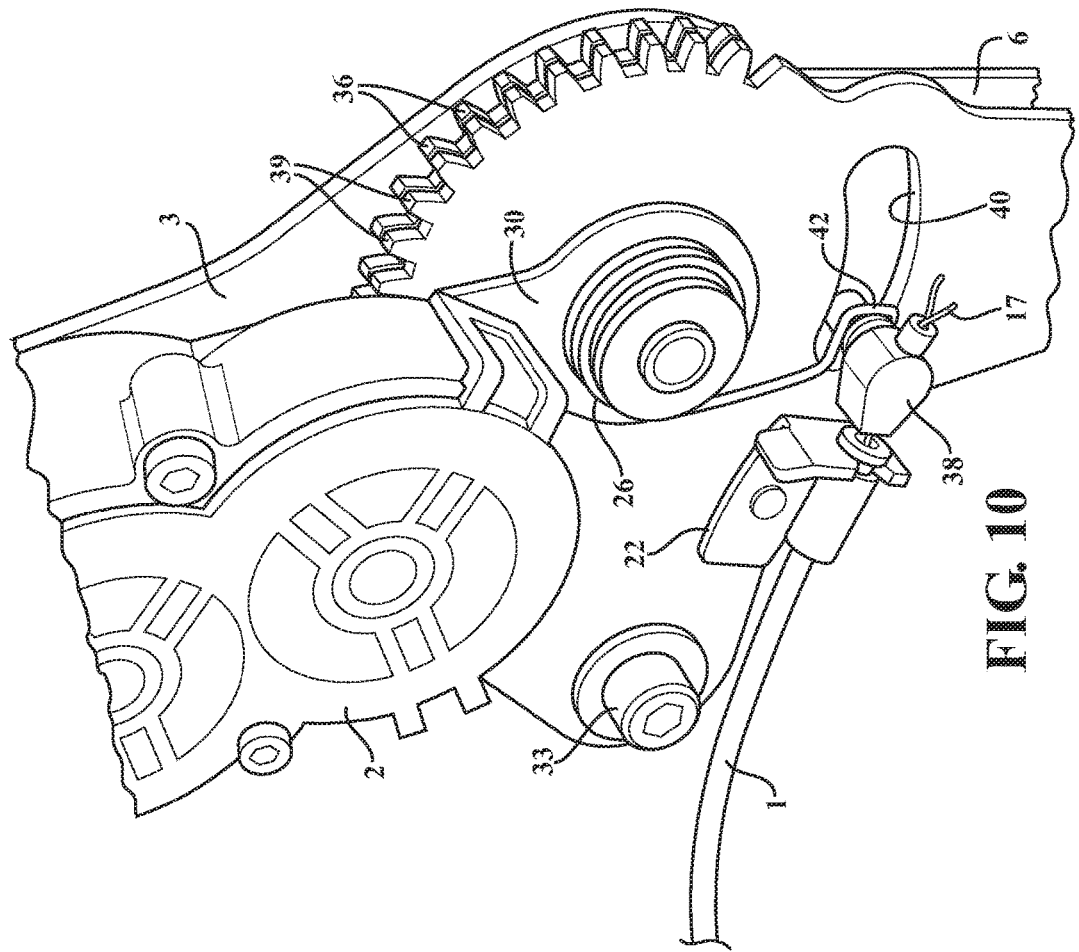
FIGS. 9-14 present a further series of perspective illustrations of the powered seat latch assembly of FIGS. 1-8 and further illustrating the cabling arrangement along with the seatback sector arm supported motor and gear.
Figure 9:
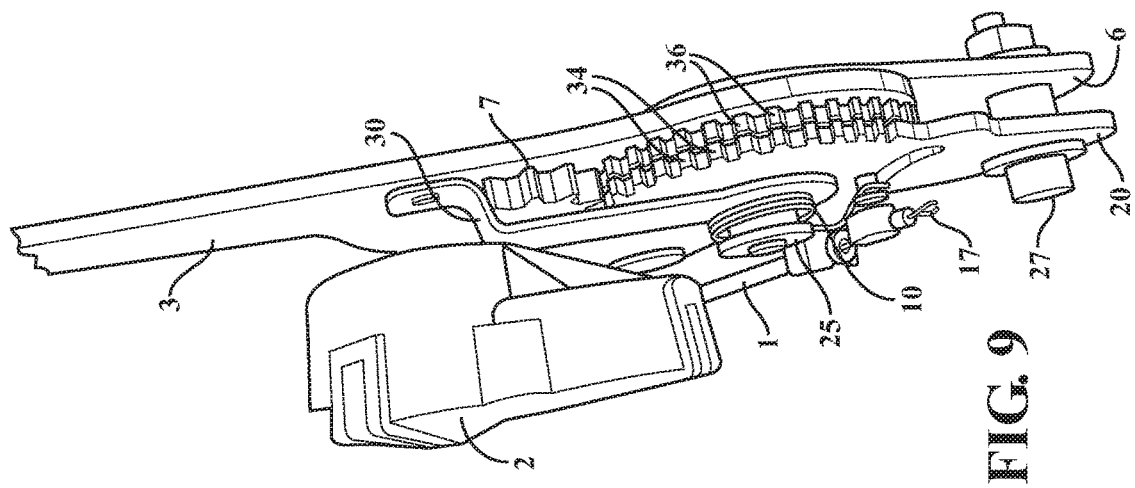
Figure 11:
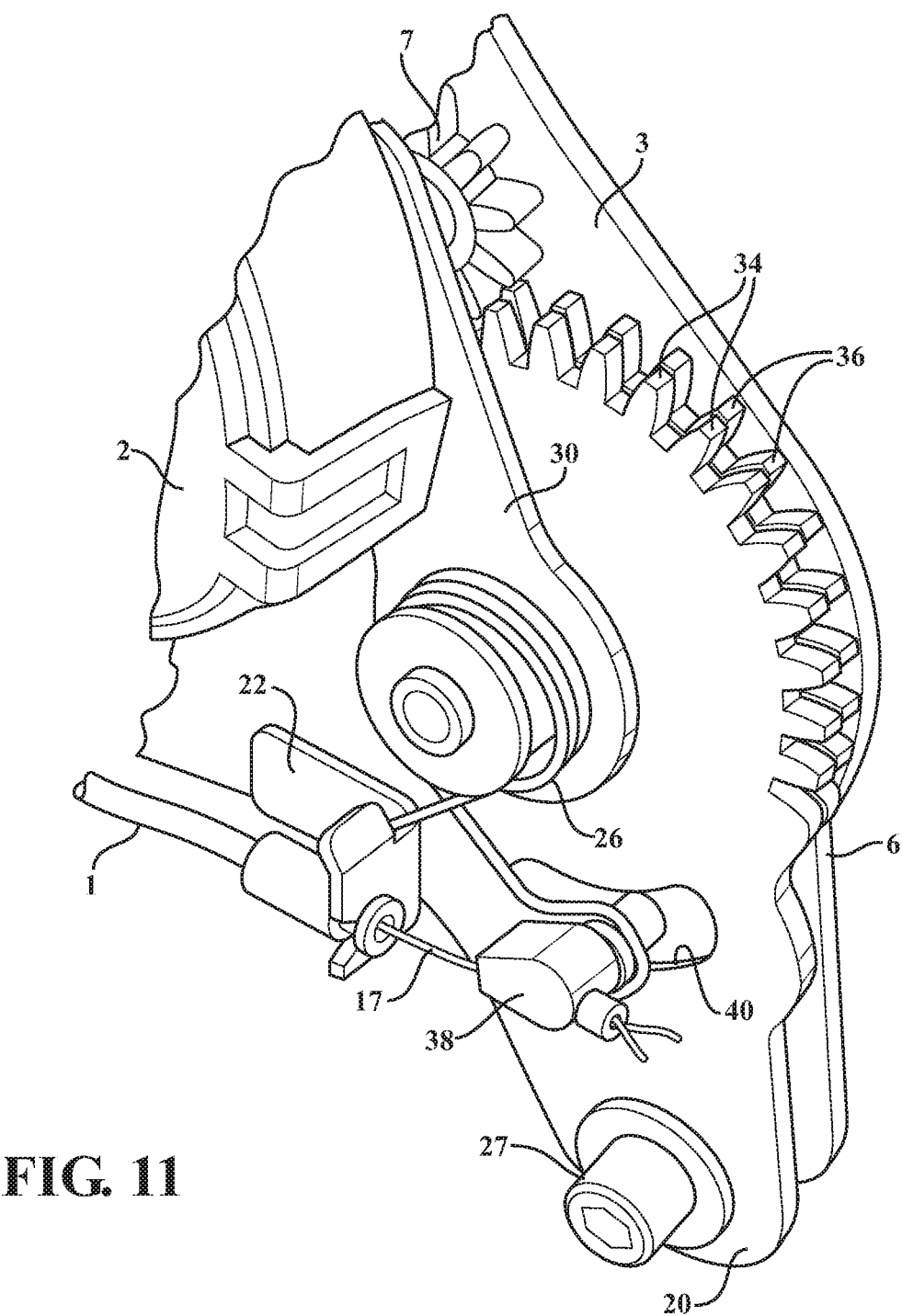
Figure 12:
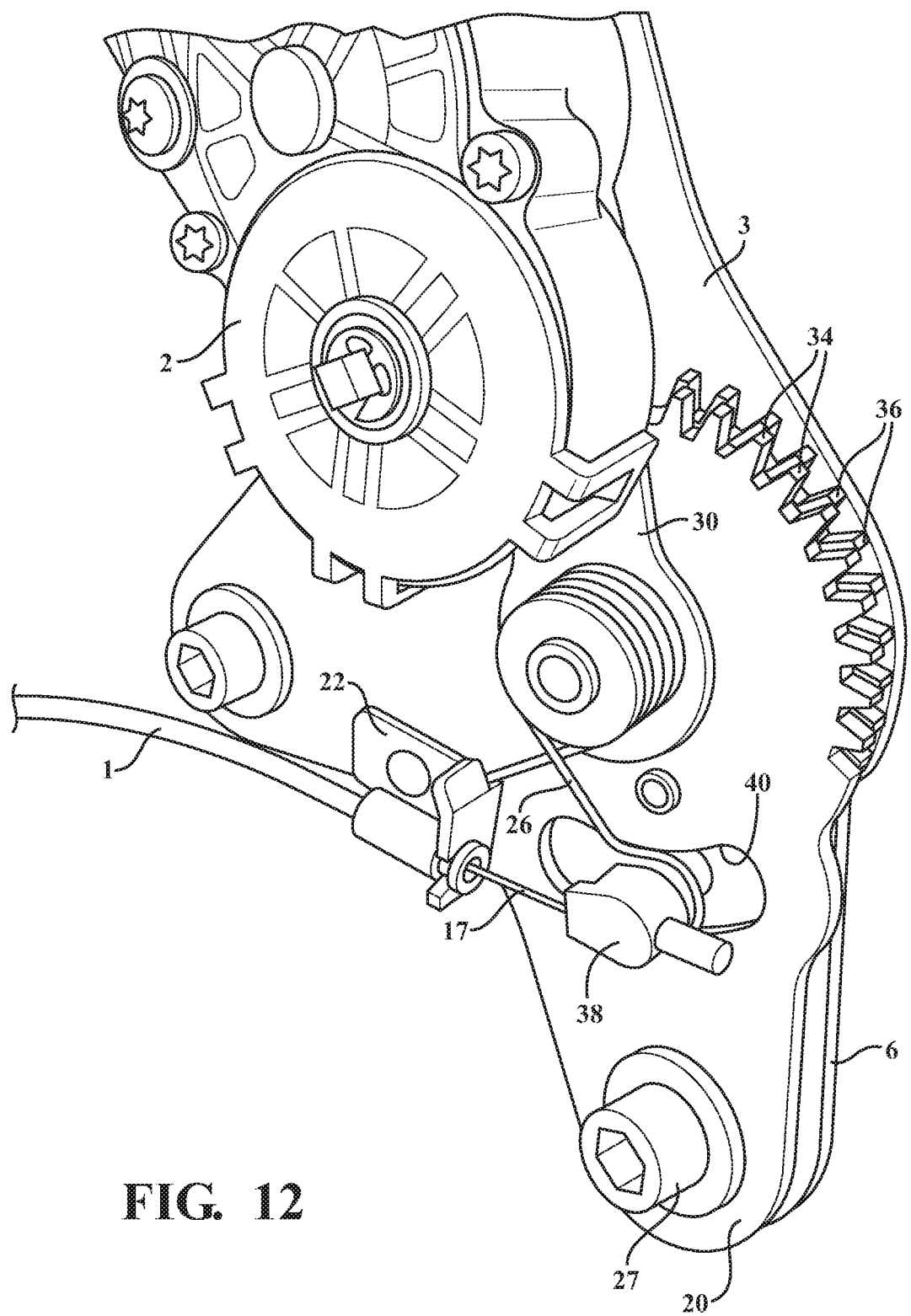
Figure 13:
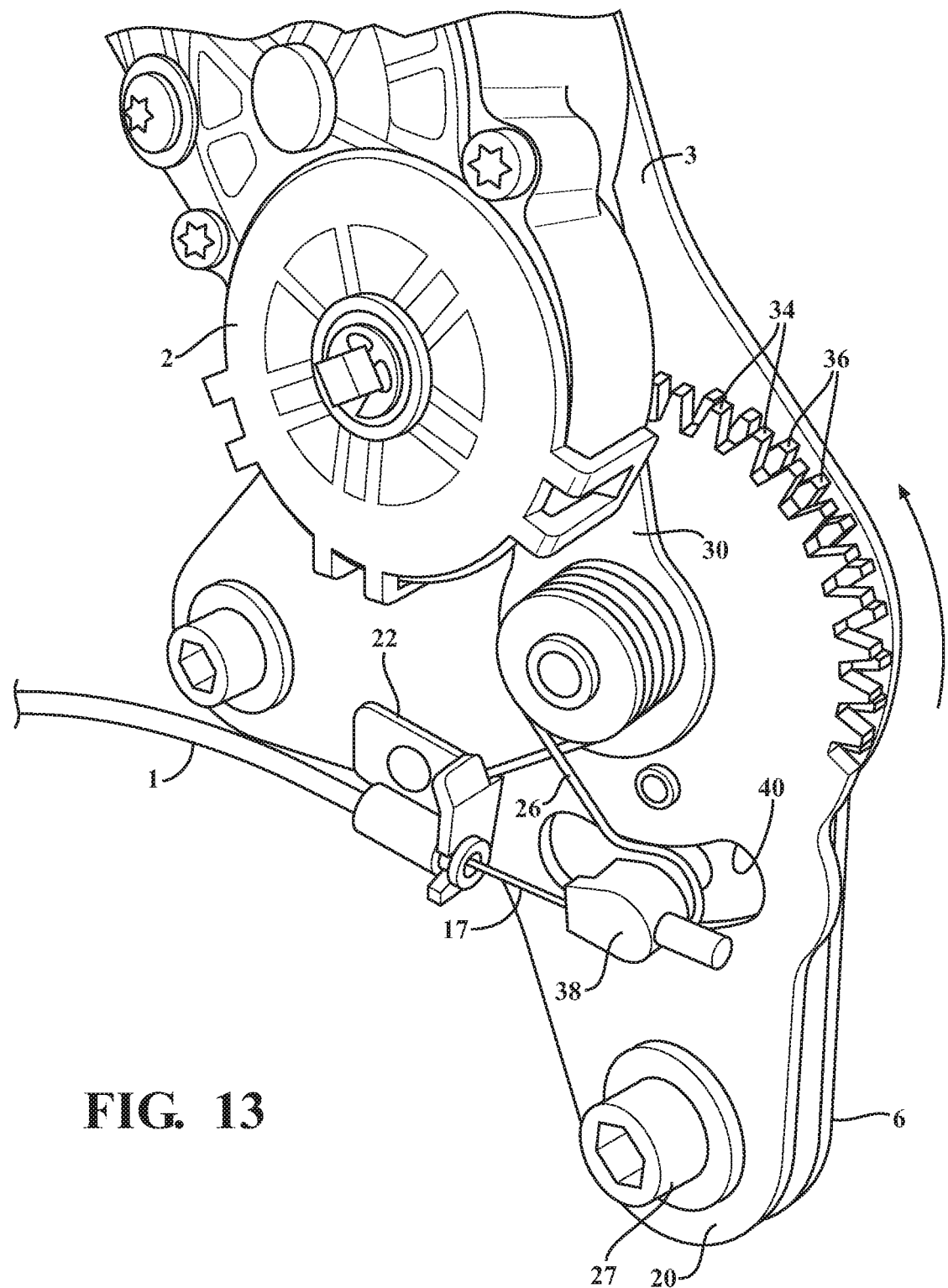
Figure 14:
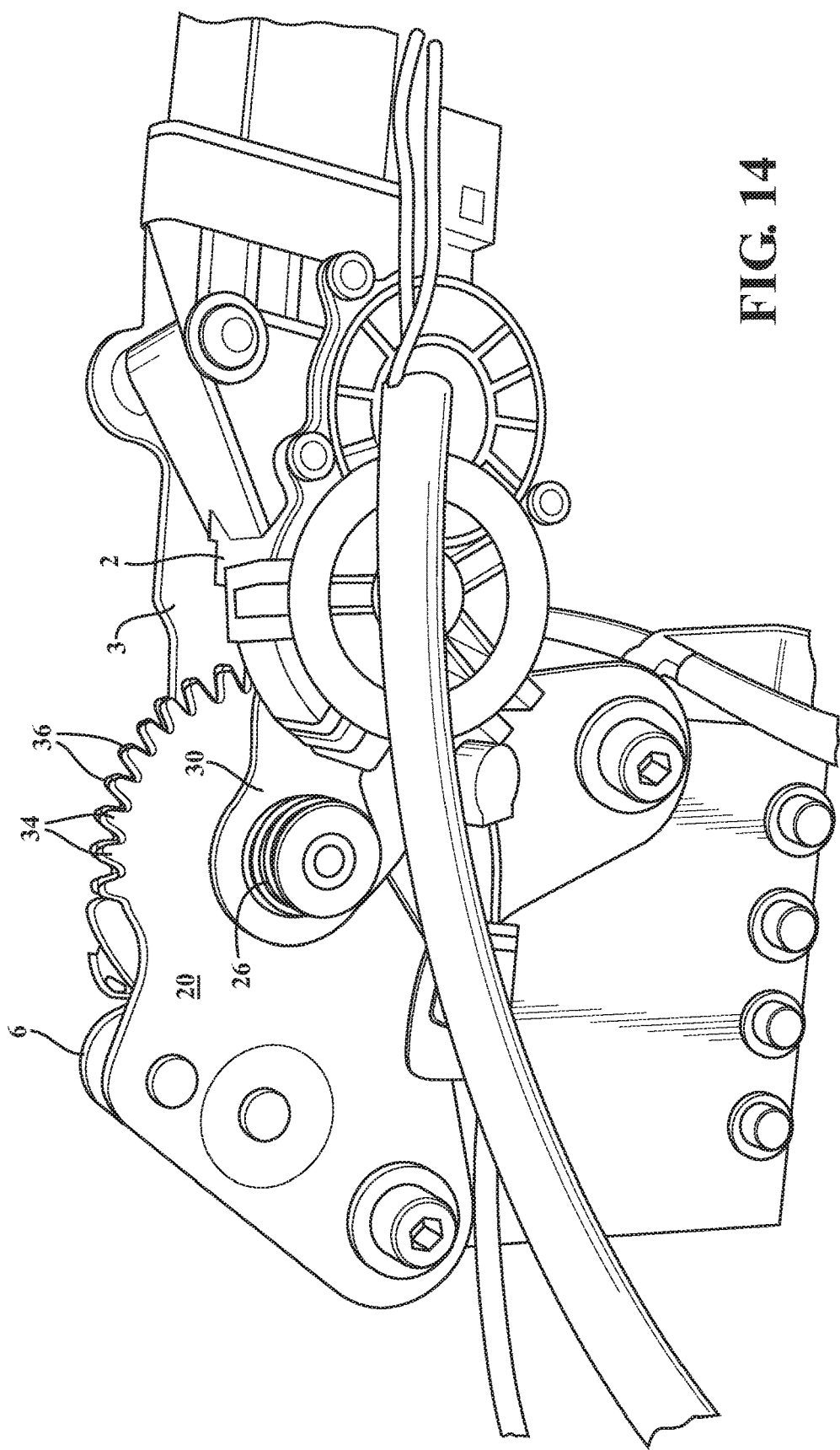

A motor 2 is mounted to the seatback arm sector 3 and includes a first mounting screw 12 engageable through an aperture 78 the motor housing and an aligning aperture 80 at an intermediate mounting location through the arm sector 3. A plate gear housing 30 is also provided and, at a lower end, secures in aligning fashion to the main pivot pin 21, in abutment against an exterior surface of the outer toothed floor sector 20 (surface opposite the gear drive sector 4), a washer 35 securing to a reverse side of the outer plate 20 seating the assembled bushing 2. A return torsion spring 26 is secured about the projecting portion of the main pivot pin 21, with the washer 25 affixing over the exposed end of the main pin 21 as depicted in FIG. 10 to maintain the structural integrity of the package.

A cable release bracket 22 (see also again FIG. 10) is secured to an exposed exterior of the outer fixed plate 20, a cable 1 with an inner translating end portion 17 extending therefrom being provided so that the cable 1 is secured to an angled end support of the bracket 22 and the inner translating end portion 17 further being integrated into a cap 38 (again FIG. 10) supported in arcuate translating fashion within a slot (see inner perimeter surface 40) defined in the outer toothed plate 20. As best shown in FIG. 10, a curled end 42 of the torsion return spring 26 affixes to a release rivet 24 which extends from a lower mounting location of the toothed gear drive 4 in seating fashion through the slot 40 (obscured by covering cap 38).

In this fashion, and as will be further described, an initial range of driven rotation of the toothed gear drive sect or 4 (in a counter clockwise direction as shown in each of FIGS. 1 and 10) results in displacement of the displaceable inner cable 17 contained within the outer cable sheath 1. Although not shown, the cable extends at a remote end to a conventional release latch associated with a headrest pivoting support secured atop a seatback associated with the seatback arm sector 3. The timing of the powered seatback release is further such that the headrest (not shown) can be triggered to the forward dump position prior to rotation of the seatback sector to the dump position.

As further best shown in FIG. 1, a motor pin 13 is provided extending from a lower rotary drive shaft location of the motor 2 and is mounted via a bushing 29 arranged between the housing 2 and the secured gear housing plate 30. A motor spacer bushing 16 and C-clip 15 are also provided for securing the end of the pin 13 to the outside of the motor housing 2.

A pinion gear 7 is mounted to an opposite end of the pin 13 and aligns with the overlapping sets of gear teeth (again at 34 associated with the outer fixed sector plate and at 36 associated with the overlapping gear drive 4). A spacer rivet 33 separates outer plate 20 from gear drive sector 4 along with both return rivet 23 and release rivet 24. Gear housing rivets 31 are also proved for securing the motor housing 2 to the sector arm 3.

Yet additional features include a cam 5 which is pivotally mounted, via cam pivot 8, to aligning locations of the floor support plates 6 and 20 which is rearwardly from the gear drive 4 and seatback arm sector 3. A cam return torsion spring 28 is provided outside of the inner plate 6 and biases a rivet 11 secured to a pivotal offset location of the cam 5 (see aperture 82) for travel within an arcuate slot 44 which is configured in the inner plate 6.

A stop rivet 18 also provided and secured between aligning apertures, at 84 and 86 respectively in the outer 20 and inner 6 plates. The stop rivet 18 extends through aligning and partially offsetting slots 64 and 88 defined respectively in the gear sector plate 4 and seatback sector 3.

In this fashion, the cam 5 is pivoted over the range of a traveling contact profile established between the rivet 11 and the contoured shoulder 46 of the seatback arm sector 3 (see FIGS. 3-5) in order to disengage the seatback arm sector 3 for travel to the dump position. The stop rivet 18 further controls both angles of rotation of the gear drive sector 4 and the seatback arm 3.

FIGS. 2-8 provide a series of side plan progression views of the latch release and dump protocol of the power mechanism of FIG. 1. For purposes of ease of depiction, selected components are repetitively depicted from the exploded view of FIG. 1. As previously described, a remote headrest (not shown) is also mounted atop a cushioned and frame supported seatback which incorporates a pair of the spaced apart sector arms 3, each of which being pivotally secured between pairs of floor supported plates or stanchions 6 and 20.

The seat latch assemblies described herein can further be incorporated into either a single or opposing pair of sides of either of 60/40 rear row seat assembly. It is also envisioned that a dummy pivot assembly can be integrated into a floor support location opposite floor support location incorporating the latch assembly 10.

A basic spring loaded and latch release mechanism (not shown) is understood to be integrated into the pivotal base support established between the headrest bun and the top of the seatback cushion. A remote extending end of the sheath interior translating cable 1 engages the headrest latch such that, upon initial rotation of the motor pinion gear 7 in the clockwise direction 50 (see FIG. 3 et seq.) depicted in each of the upright design position of FIG. 2 and the succeeding initial cam disengagement position of FIG. 3, at which the gear drive sector 4 is counter rotated in a counter clockwise direction, see further at 52 in FIG. 3, the pinion gear also winding initially across the overlapped teeth 34 of the fixed floor support plate/stanchion 20.

The cap 38, secured to a lower radially offset location of the gear plate 4 relative to the central pivot pin 21, consequently is arcuately translated in the direction shown by further arrow 54 (see again FIG. 3), the result being that the inner portion 17 of the cable (again FIG. 10) is translated relative to the fixed outer cable sheath 1. This in turn results in the triggering of the remote seatback mounted headrest at FIG. 4, at which the headrest is released for rotation to the dump position. Also depicted at FIG. 2 et seq. is an additional structural bracket 56 which extends between a first mounting end 58 to a surface of the seatback arm 3 and a further end 60 which is secured about the main pivot 21 and in order to structurally support the associated seatback.

Figure 4:
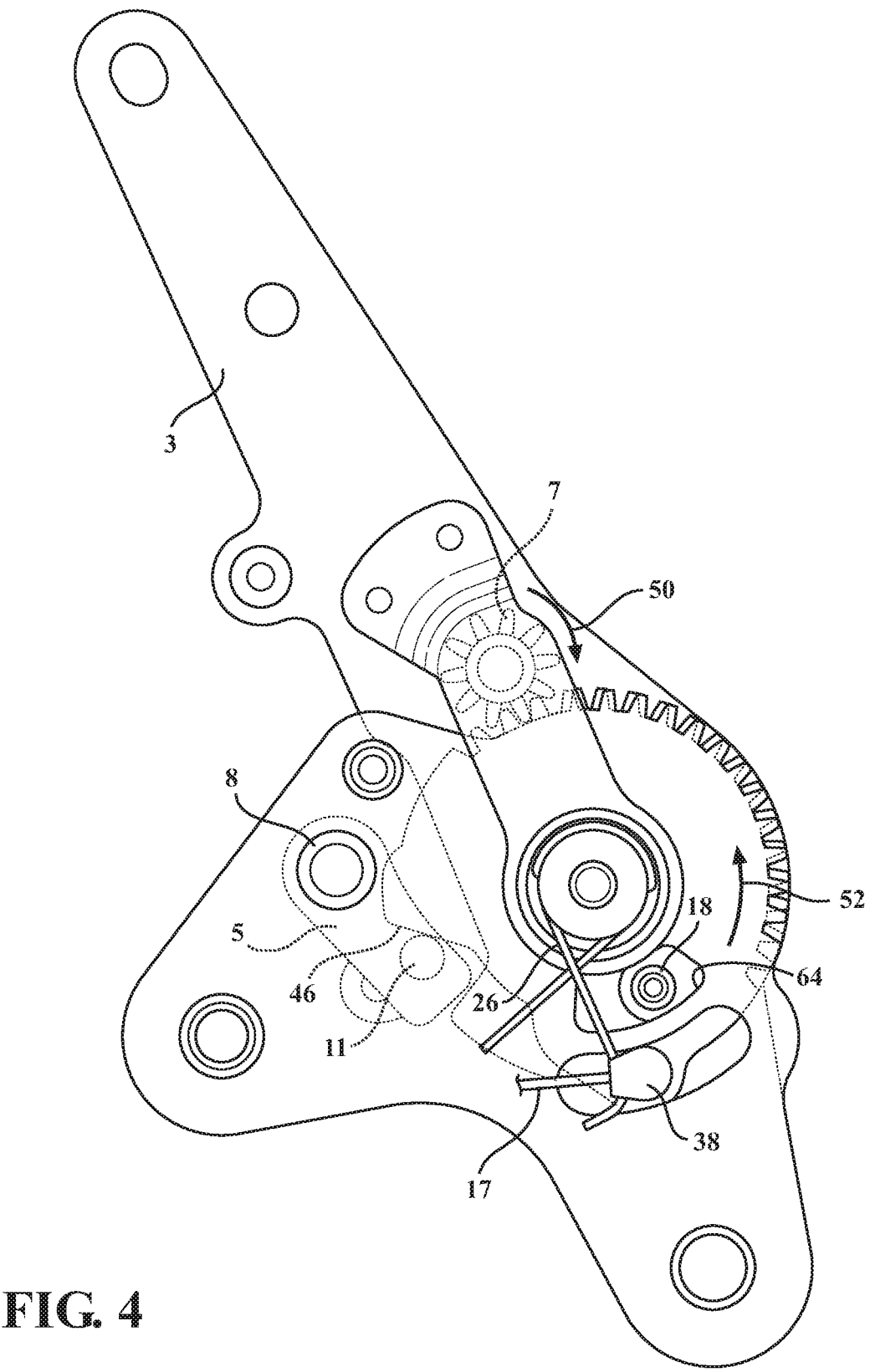
FIG. 4 is a further succeeding illustration of a remote headrest release established by a displaceable cable and supporting bracket secured to a fixed seat bottom and which is triggered by initial rotary displacement of the rotatable teethed sector by the motor pinion gear.
Figure 5:
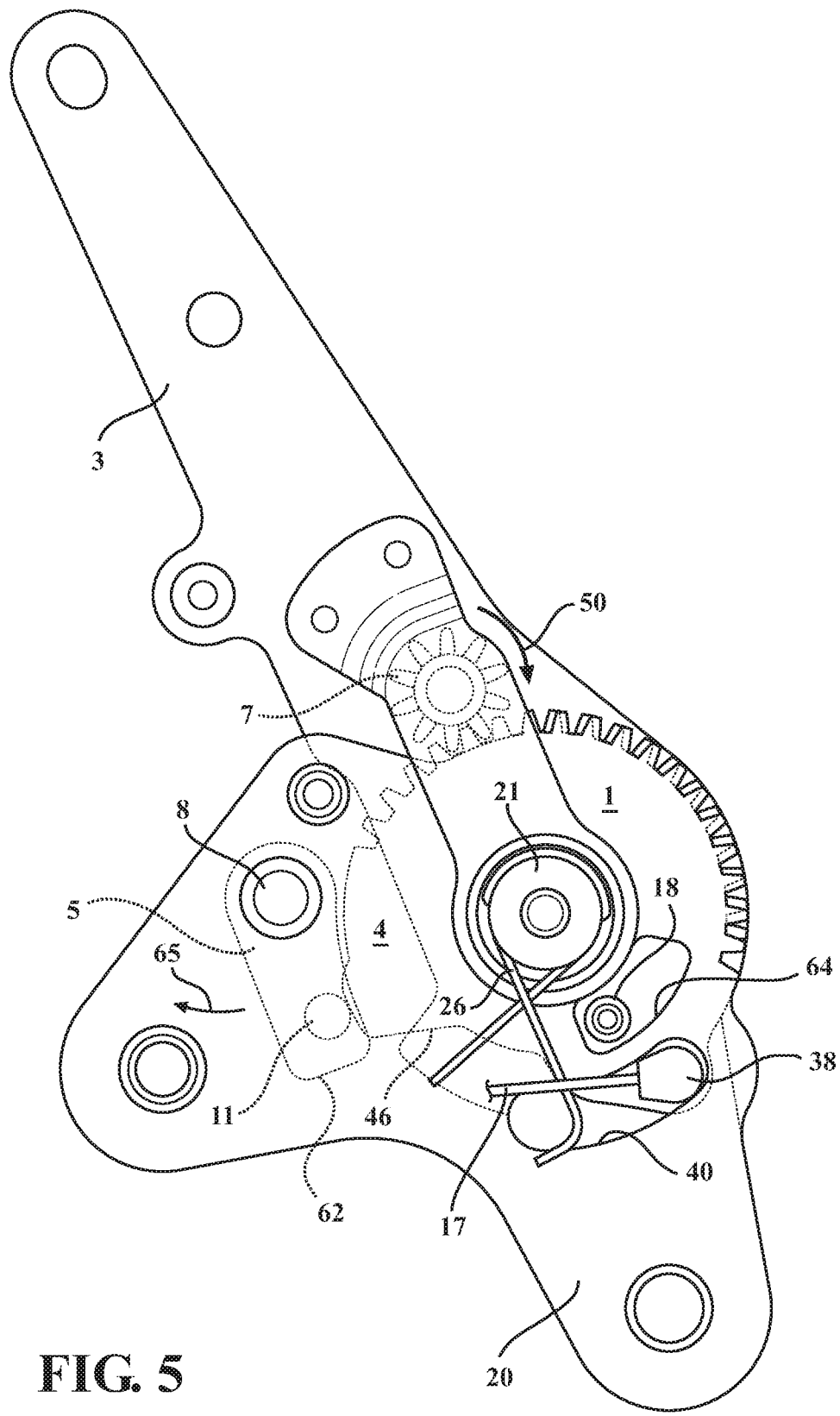
FIG. 5 succeeds FIG. 4 and illustrates the pivotal cam influenced to a release position relative to the seatback arm sector.
Figure 6:
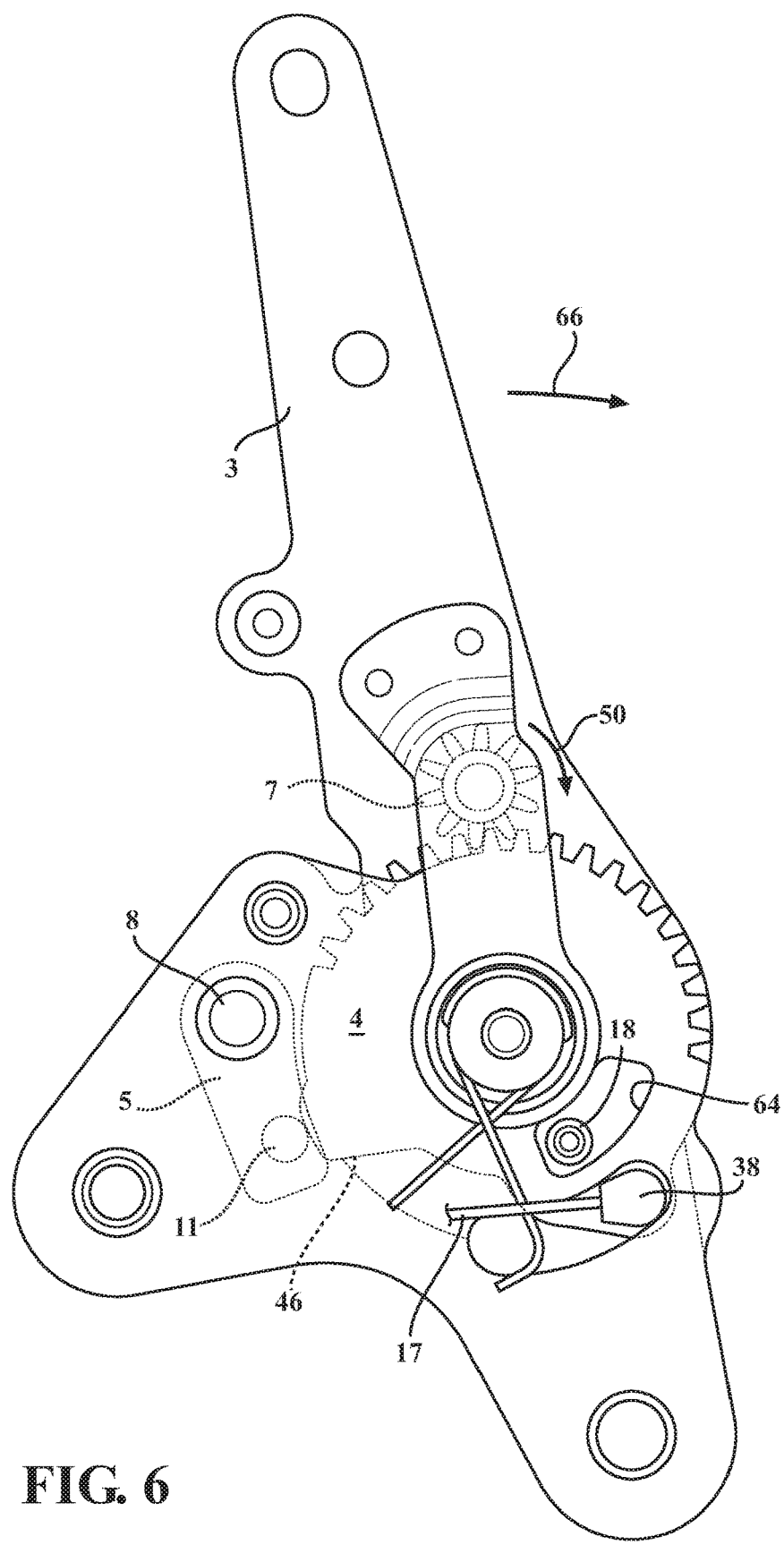
FIGS. 6-7 succeed FIG. 5 and depicts a handoff from the rotatable teethed sector to the overlapping fixed teethed sector in which continuous driving of the motor pinion gear results in forward rotating motion of the seatback arm to the dump position.
Figure 7:
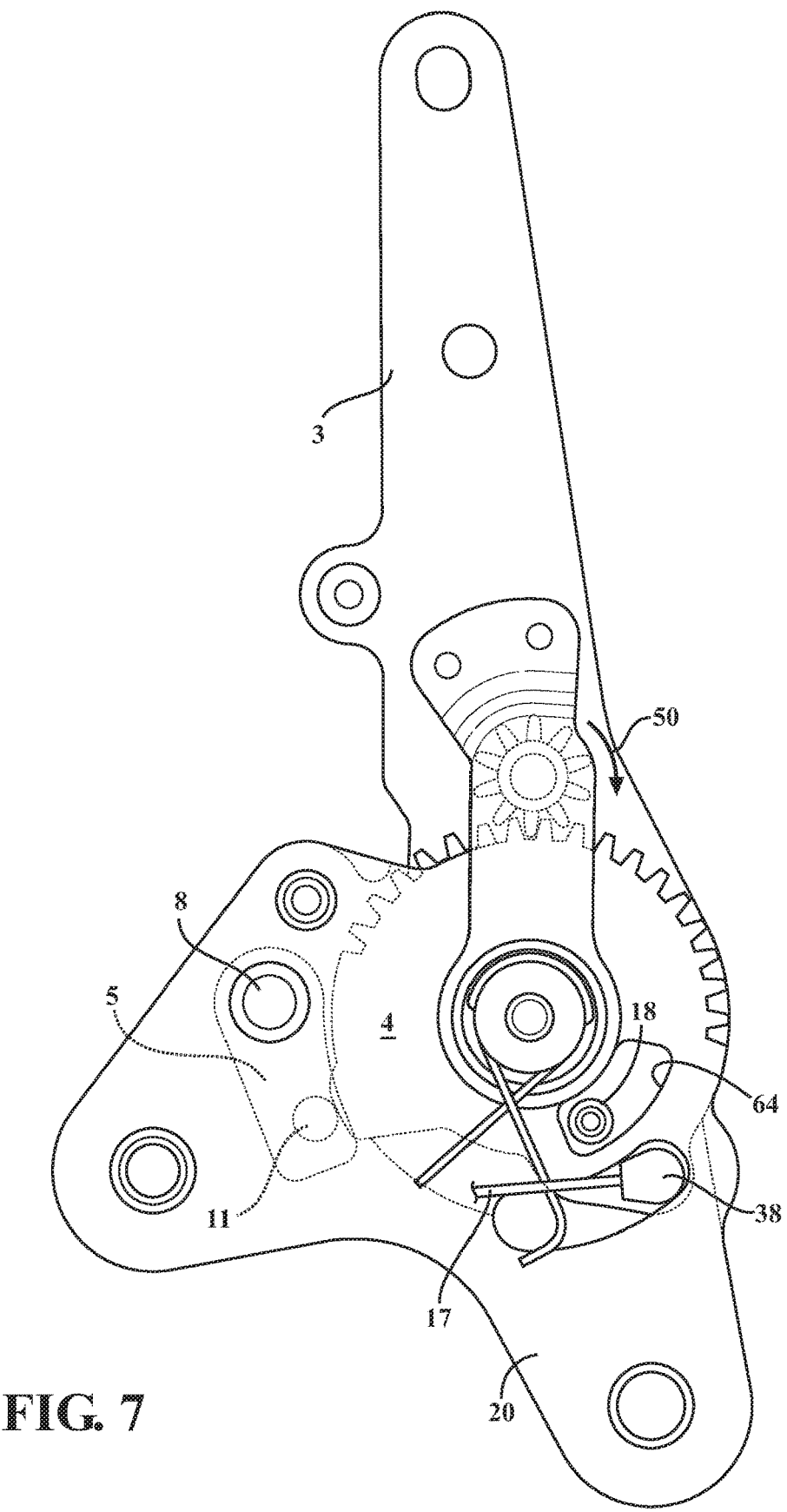

FIG. 5 succeeds FIG. 4 and illustrates the pivotal cam 5 influenced to a release position relative to the seatback arm sector 3, this again reflected by end abutment 62 of the cam 5 pivotally displacing (see cw arrow 65) out of engagement with the shoulder or ledge abutment 46 of the seatback sector arm 3. At this point, and through the end of the forward powered dump cycle of FIGS. 6-9, continued winding of the motor pinion gear 7 results in the stop rivet 18 abutting an inner arcuate end stop of a slot 64 formed in the rotating gear drive plate 4, this concurrent with the cap and pin 38 abutting an opposite directed end of the slot 40 configured in the base plate 20 (this best shown in FIG. 5).

Following the position of FIG. 5, continued winding of the pinion gear 7 (arrow 50) continues along (and is handed off to) the stationary teeth 34 of the outer stanchion support plate 20 (the limited rotational range of the gear drive plate 4 again having been met by the position of FIG. 5). As such, FIGS. 6-7 succeed FIG. 5 and depict the handoff from the rotatable teethed sector to the overlapping fixed teethed sector in which continuous driving of the motor pinion gear results in forward rotating motion of the seatback arm to the dump position (see arrow 66 in FIG. 6).

Figure 8:
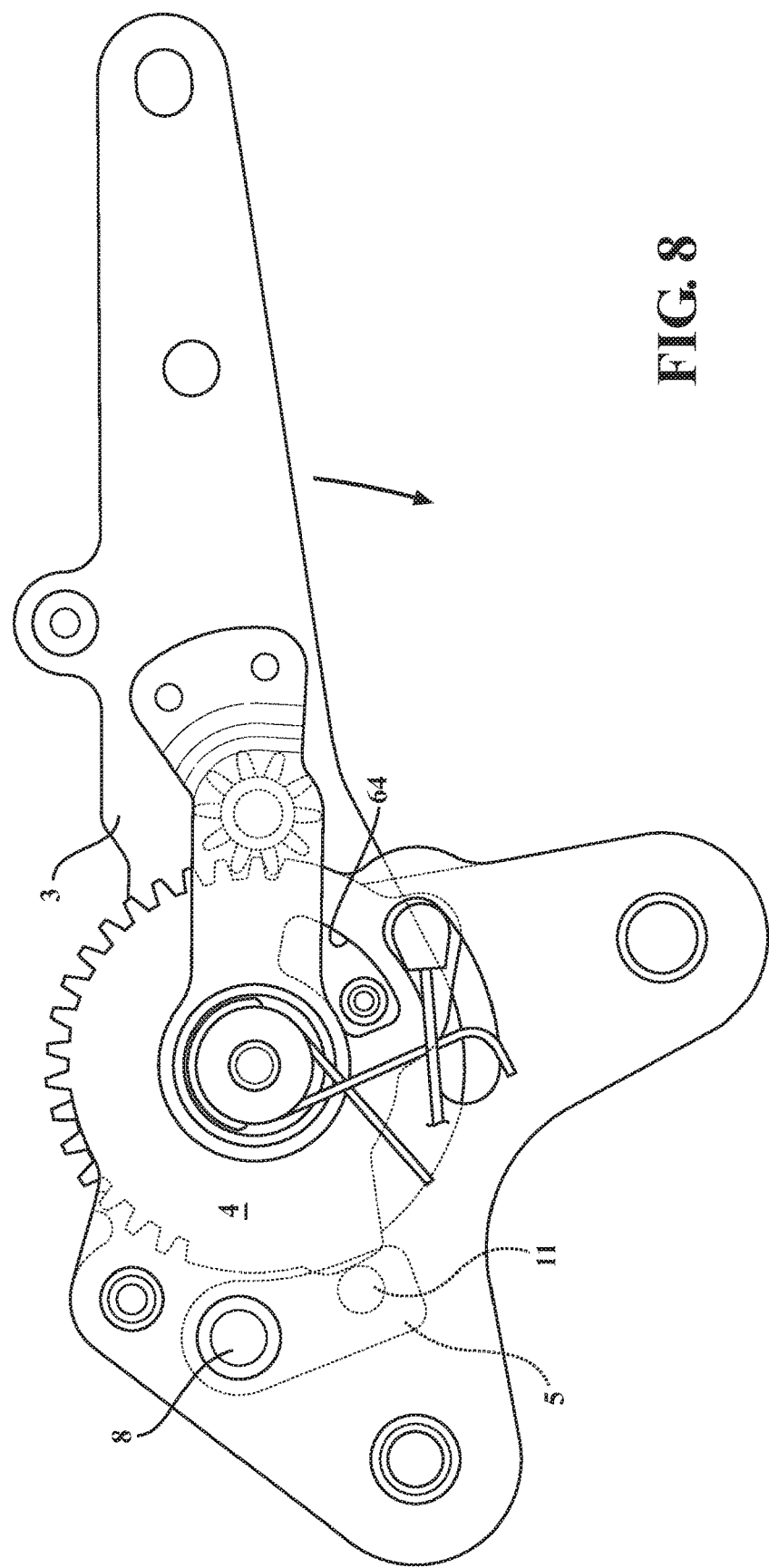
FIG. 8 is a succeeding illustration of the seatback in a forwardly folded dump position.

FIG. 8 is a succeeding illustration of the seatback in a forwardly folded dump position and in which the motor pinion gear 7 is fully wound to the end of the stationary gear teeth 34 (along with the coinciding and overlapped gear teeth 36 of the gear drive plate 4 which is likewise stationary following the position achieved in FIG. 5). Reverse upright rewinding of the seatback sector arm 3 (and associated seatback) is achieved by reverse rotating the pinion gear 7 back to the design position of FIG. 2, it being noted that FIGS. 2-4 in reverse order depict the reverse handing off of the pinion drive to the rotating gear plate 4 which then pivots from the stopped position of FIG. 4 and back to the design/reset position of FIG. 2.

At this point, the latch assembly is fully reset. FIGS. 9-14 present a further series of perspective illustrations of the powered seat latch assembly of FIGS. 1-8, and which again further illustrates the cabling arrangement along with the seatback sector arm supported motor and gear and are provided to further illustrate the operational aspects of the disclosed variant from a variety of close up angles.

Figure 19:
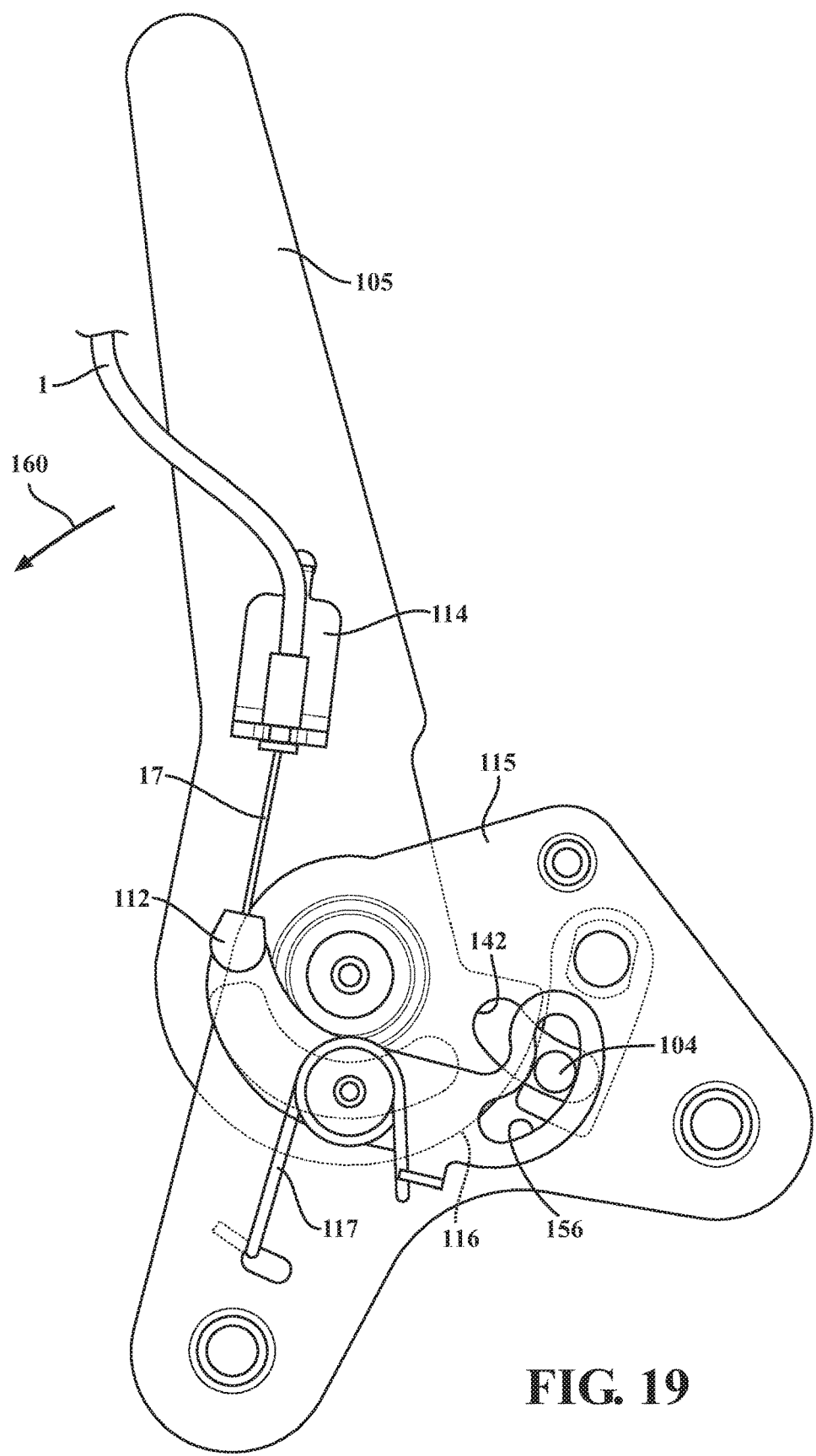
FIG. 19 is a succeeding cam bypass position illustration the seatback arm sector in an intermediate spring influenced dump position.
Figure 20:
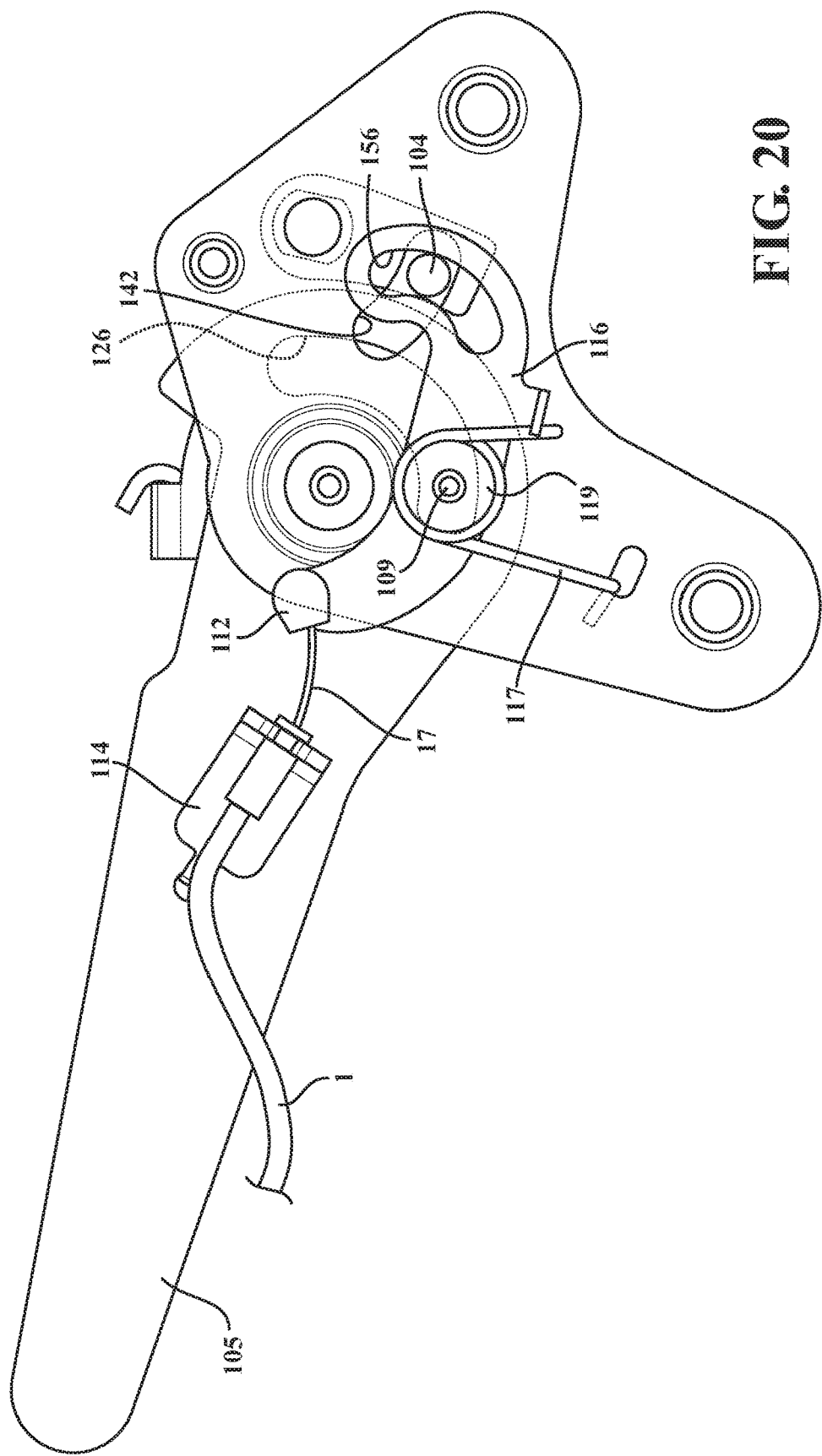
FIG. 20 illustrates the seatback in a fully rotated dump position.

Proceeding to FIG. 15, an exploded build of material perspective view of the rear row seat latch assembly according to a second manual variant is again shown 100'. Along with succeeding plan views of FIGS. 16-20 and the additional mock up views of FIGS. 21-23, the manual redesigned variant substitutes for the power variant 10 of FIG. 1 by integrating a main pivot clock spring 111 for driving the associated seatback arm 105 to the forward dump position (FIG. 20).

Outer 101 and inner 115 stanchion plates are provided and which are secured to the floor location and to one another by an arrangement of spacer rivets and bushings (see for example at 110). A main pivot pin 106 is provided for securing through aligning apertures in the plates 101/115 (see at 121 and 123) such that the seatback arm 105 is pivotally supported therebetween via a keyed aperture 122 which seats a keyed intermediate location 124 of the main pivot 106.

The seatback arm 105 further includes an arcuate defined slot (see inner closed rim edge 126) extending in inwardly spaced proximity to a bottom contoured edge surface, a further location of which being depicted by a shoulder or capturing ledge surface 128. Seated within the slot 126 is an end-most portion of an elongated pin 109 which is mounted to an aperture 130 configured within the inner stanchion plate 115, the pin 109 defining a range of rotation of the seatback arm 105 between design and forwardly folded positions.

A stop rivet 103 is shown and which engages an aperture location 132 of the inner stanchion 115 to define an upright design position of the seatback (FIG. 16) in abutment against an intermediate configured edge location 134 of the seatback arm. A pivoting cam 107 is provided similar to that shown in FIG. 1 and is rotationally supported between the stanchions 101/115 via a cam rivet 102 with a keyed 136 intermediate location which seats within a mating keyed inner aperture edge profile 138 associated with the cam 107.

A cam release rivet 104 engages a pivotally offset location 140 of the cam 107, the rivet 104 seating through a further arcuate slot 142 configured in the inner stanchion 115 and in order to define a range of pivoting motion of the cam 107 between a first design position (FIG. 16) in which an abutting edge 144 of the cam 107 contacts the edge configured shoulder 128 of the seatback sector 105 and the disengaged position (FIGS. 18-20) in which the seatback is released for spring influenced pivoting to the forward dump position. At the release location, the main clock spring 111 includes a curled outer edge 146 which abuts an angled edge tab 148 of the outer stanchion plate 101 and, in combination with an inner/central curled location 150 of the spring seating within the a receiving slot edge 152 of the main pivot pin 106, introduces a rotational bias to the seatback arm to influence it to the dump position in the absence of the cam 107 end surface 144 in engagement with the seatback shoulder 128. A spacer washer 120 secures to a projecting end of the main pivot pin 106 at an outer surface of the inner stanchion 115 opposite the mounting location of the clock spring 111 to the exterior of the outer stanchion 101.

Additional to the pivoting cam 107, a second elongated and somewhat arcuate shaped cam release bracket 116 is also provided and which is mounted, via a bushing 119 and associated torsion spring 117, to an exterior of the inner stanchion 115 (see also aperture 154 at generally central location of the elongated cam release bracket 116 which defines a central pivot location through which the bushing 119 is received). An arcuate edge of the cam release bracket 116 is further configured with an interior slot 156, such overlapping the slot 142 in an offset fashion so that the cam release rivet 104 extends through both slots 142/156, the further result of which being that pivoting of the cam release bracket 116 in the direction of FIGS. 17-20 (see arrow 158) forcing the cam release rivet 104 to travel through the overlapping slots 142/156 to the position of FIG. 18 in which the pin 104 travels to the rear edge of the inner stanchion defined slot 142 and the cam 107 is unseated from the seatback sector shoulder 128.

A cable release bracket 114 and associated engagement portion 113 (similar to that shown at 22 in FIG. 1) is provided with the bracket 114 secured to an intermediate location of the seatback sector 105 via a rivet 108. An inner translating portion of a cable (such as depicted again in FIG. 10 by inner translating portion 17 extending from fixed and outer cable sheath 1) is again provided and so that the inner translating portion extending from the cable release bracket is secured to a release rivet 118 and associated cap 112 secured to an opposite end (see at 158) of the curved release bracket 116.

Figure 16:
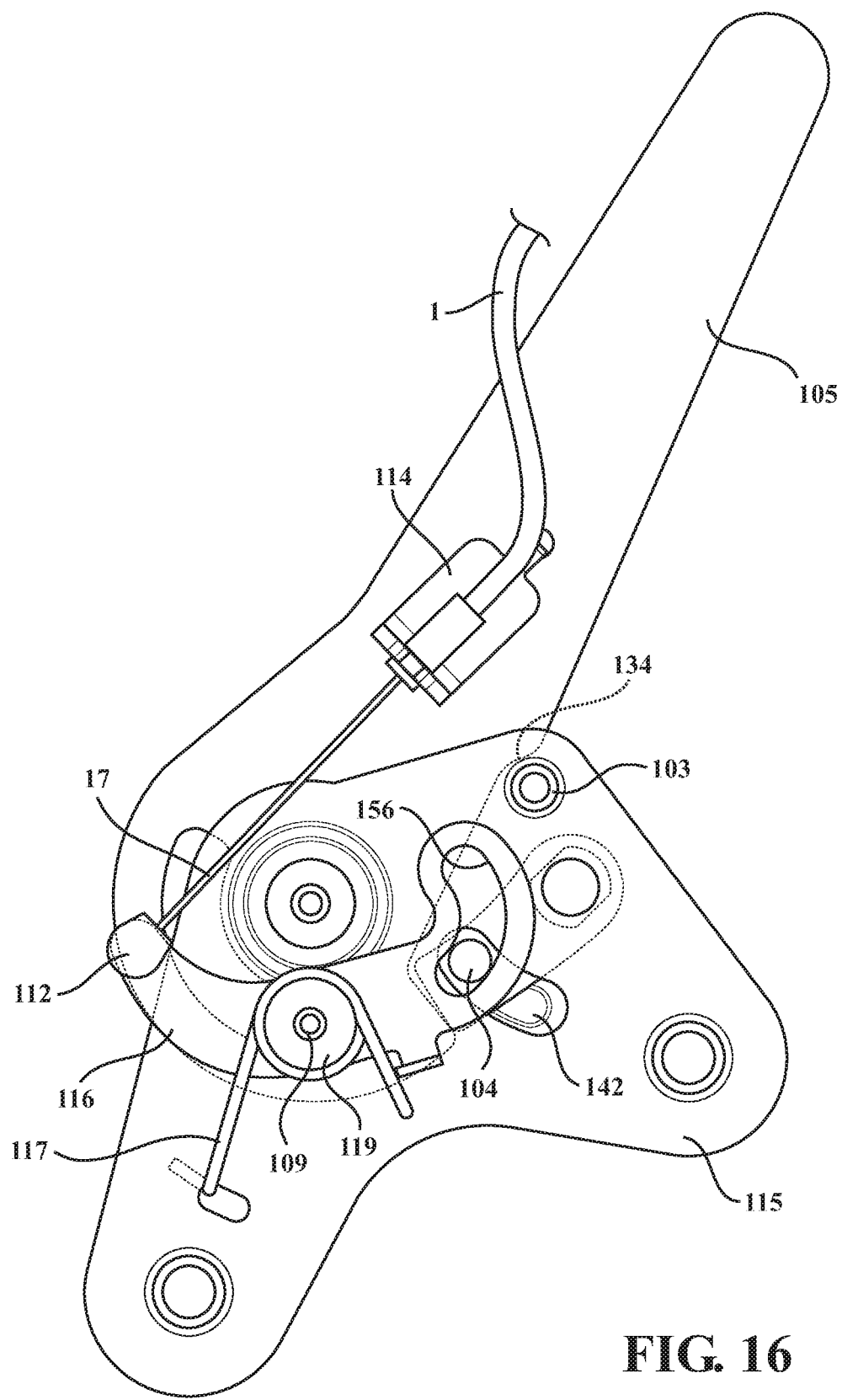
FIG. 16 is a first side plan illustration of an initial upright design position associated with the seatback latch assembly according to FIG. 15.
Figure 17:
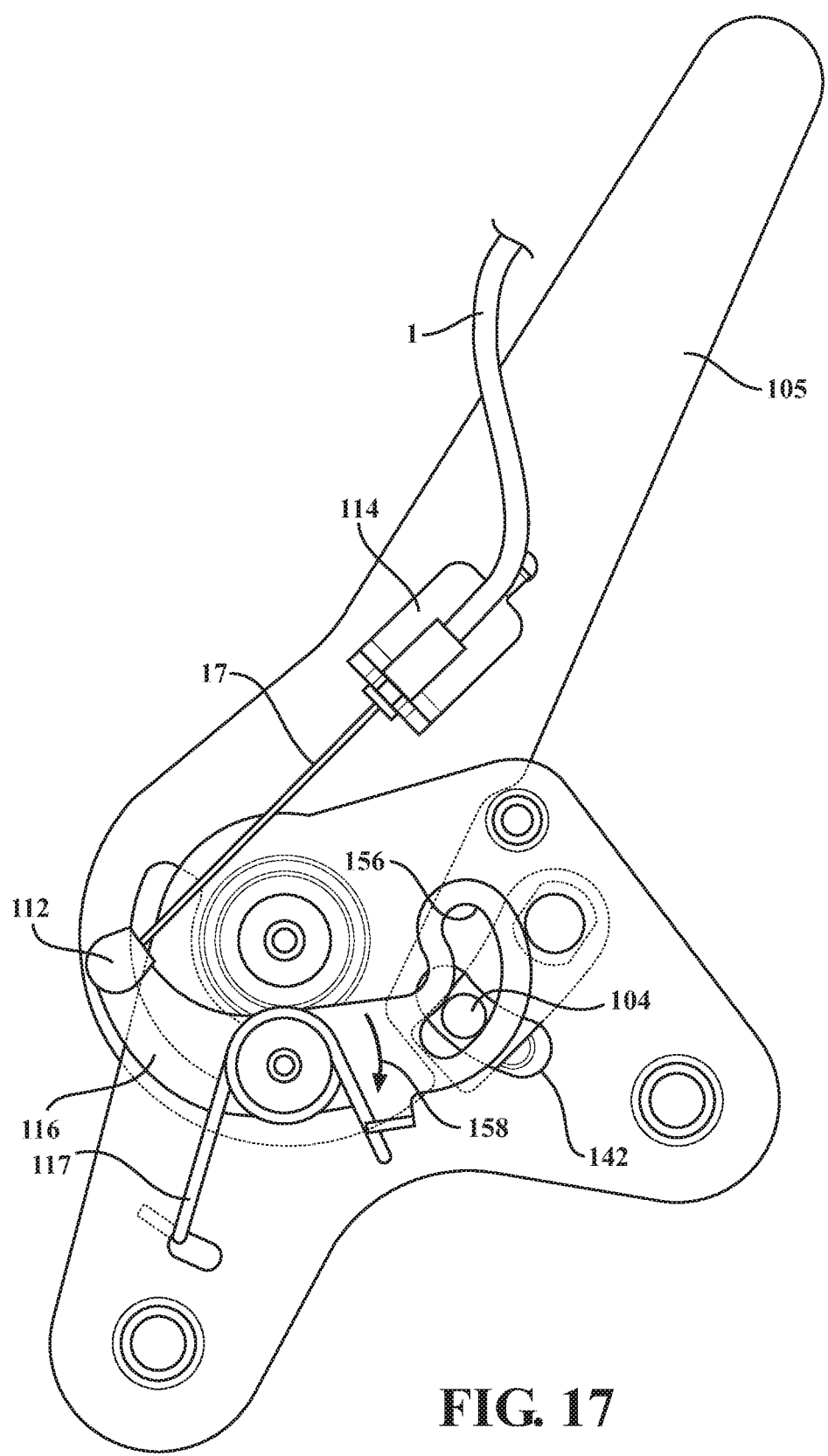
FIG. 17 is a succeeding illustration to FIG. 16 and showing the cam release bracket being initially pivoted (such as via a cable release) and in order to initiate counter-pivoting of the seatback arm sector supporting cam, and further concurrent with release of the remote headrest to the dump position.
Figure 18:
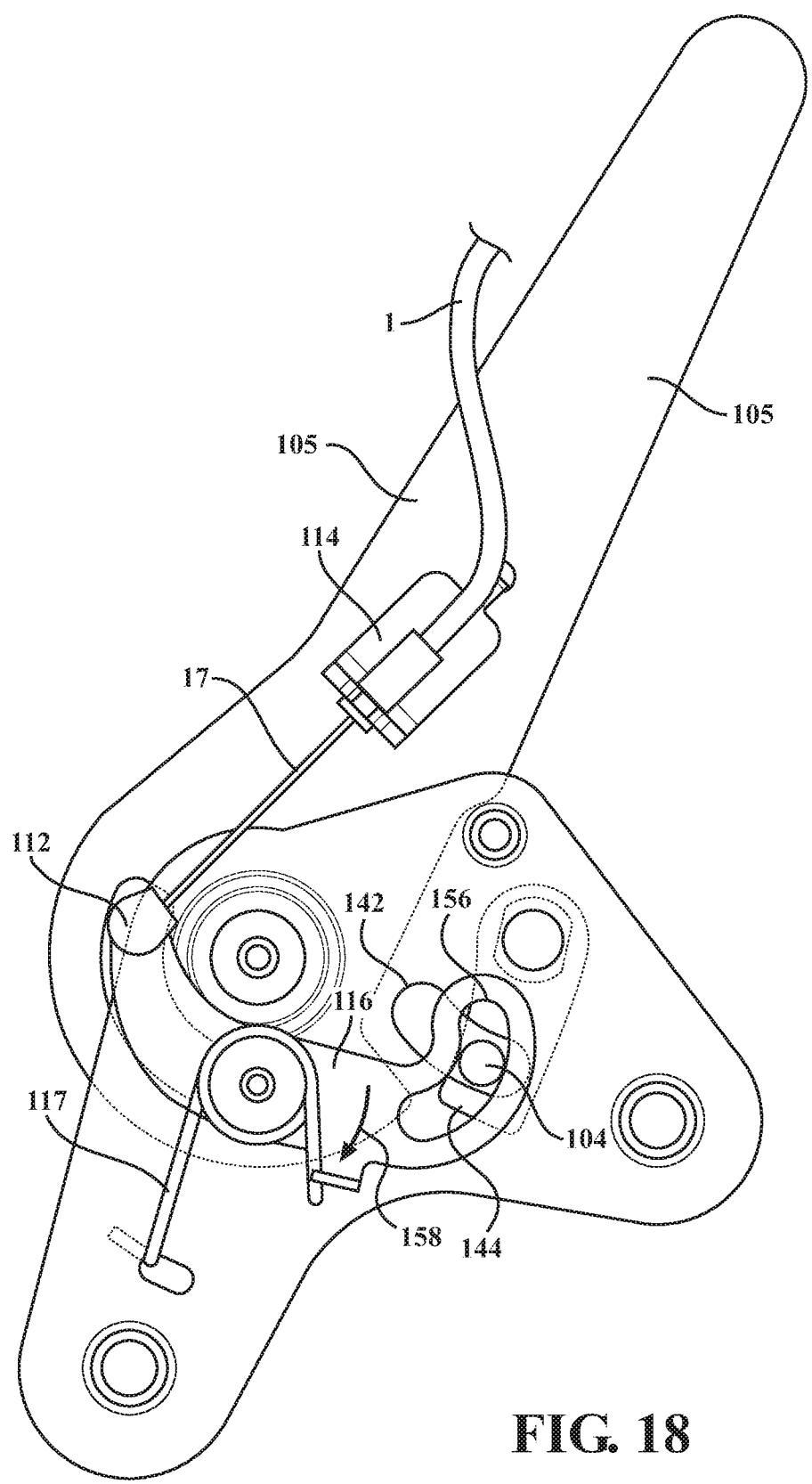
FIG. 18 is a succeeding illustration of a cam release position permitting unrestrained forward and main clock spring supported rotation of the seatback arm sector toward the dump position.

Upon assembly, the bias of the torsion spring 117 influences the cable release bracket 116 to the design position of FIG. 16 with the counter (cw) rotating influence exerted by the inner translating wire portion of the cable exerted on the end 158 influencing the linkage interconnected pivoting of the cams 116 and 107 (via rivet 104 again configured through overlapping and offset slots 142/156) overcoming the torsional spring bias and displacing the interior package situated cam 107 to the release position of FIG. 18.

Given the above structural description, and proceeding to FIGS. 16-20, a series of plan view illustrations are provided of the manual seat latch assembly between the upright design (FIG. 16) and forward folded dump (FIG. 20) positions. FIG. 16 is a first side plan illustration of an initial upright design position associated with the seatback latch assembly according to FIG. 15, with FIG. 17 being a succeeding illustration and showing the cam release bracket 116 being initially pivoted (such as again via a cable release and as depicted by arrow 158) in order to initiate counter-pivoting of the seatback arm sector supporting cam 107 (via keyed location 137 of cam rivet 102 shown in FIG. 15 which seats within keyed interior profile 138 of the cam 107), and further concurrent with release of the remote headrest to the dump position as previously described in the variant 10 of FIG. 1.

FIG. 18 is a succeeding illustration of a cam release position permitting unrestrained rotation of the main clock spring 111 (not shown in this figure for purposes of ease of illustration) and supported rotation of the seatback arm sector toward the dump position. FIG. 19 is a succeeding cam bypass position illustration the seatback arm sector 105 in an intermediate spring influenced dump position as indicated by directional arrow 160. Finally, FIG. 20 illustrates the seatback in a fully rotated dump position consistent with the release pin 109 and end attached bushing 119 fully traversing within the arcuate slot 126 in the seatback arm 105 and contacting a forward end thereof.

Figure 21:
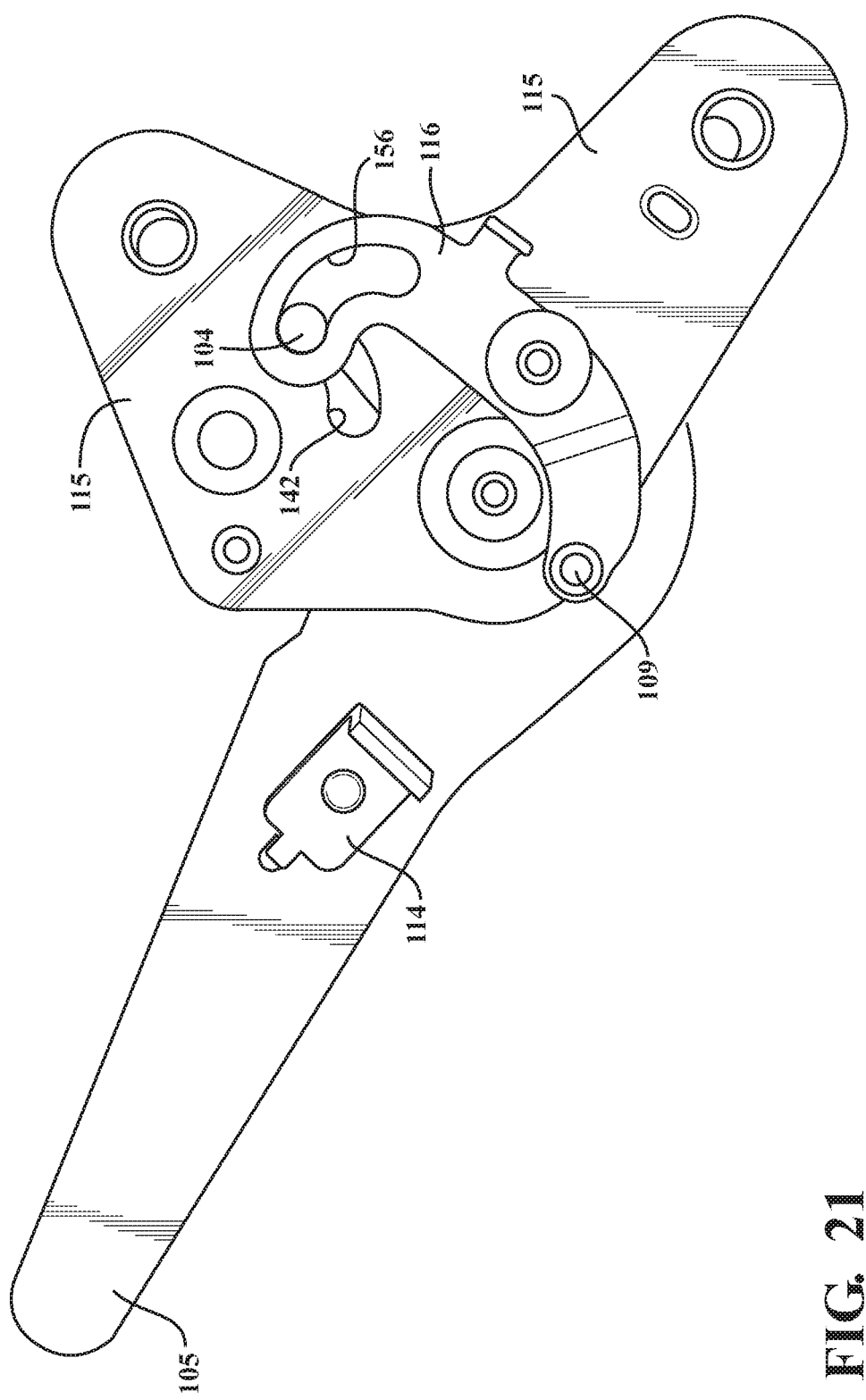
FIGS. 21-23 are a series of additional mockup plan views of the variant of FIG. 15 and corresponding to FIGS. 16-20 and better illustrating the inter-displacing motion established by the cam actuated release bracket for rotating the seat back arm relative to the floor supported stanchions.
Figure 22:
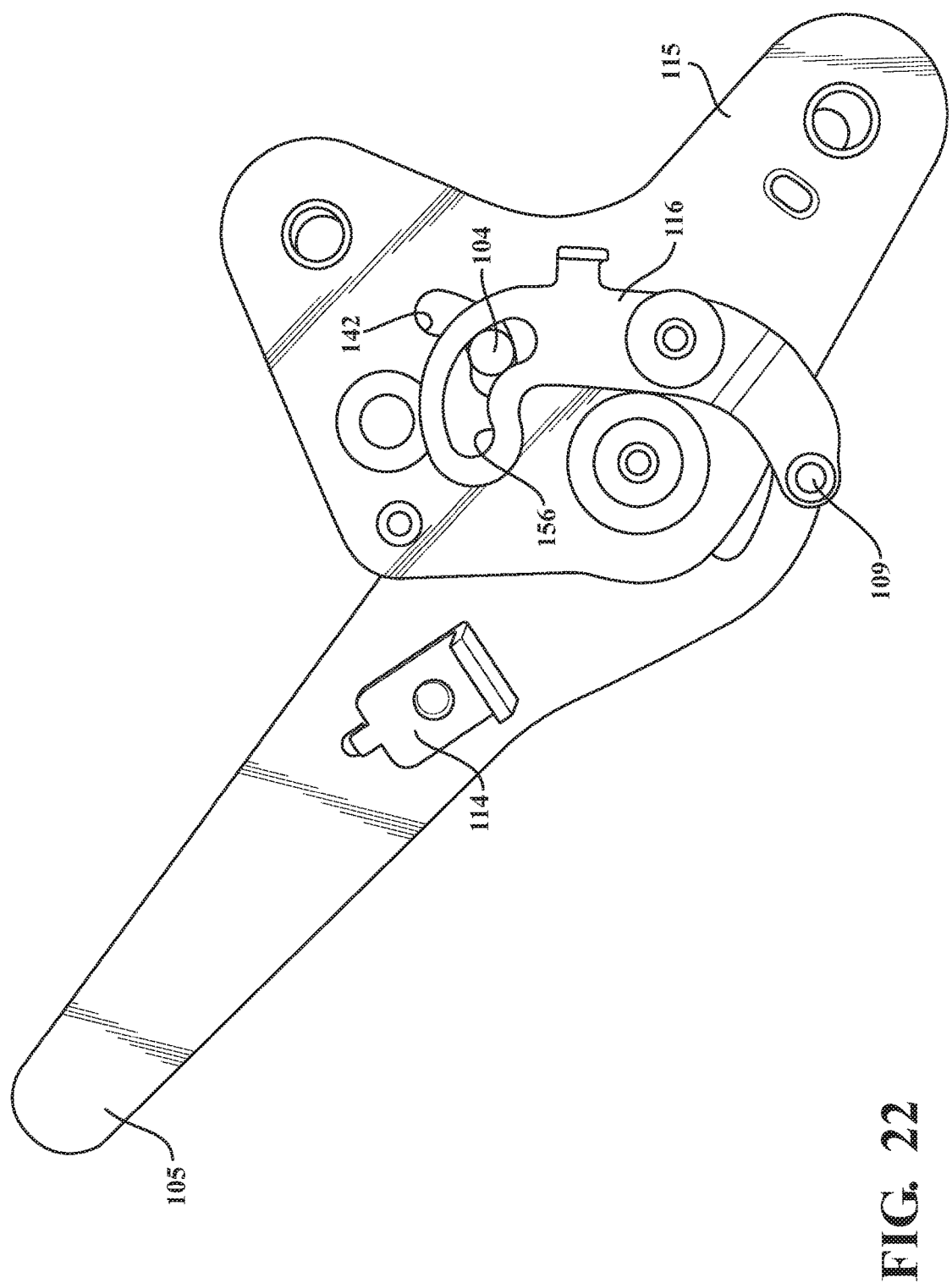
Figure 23:
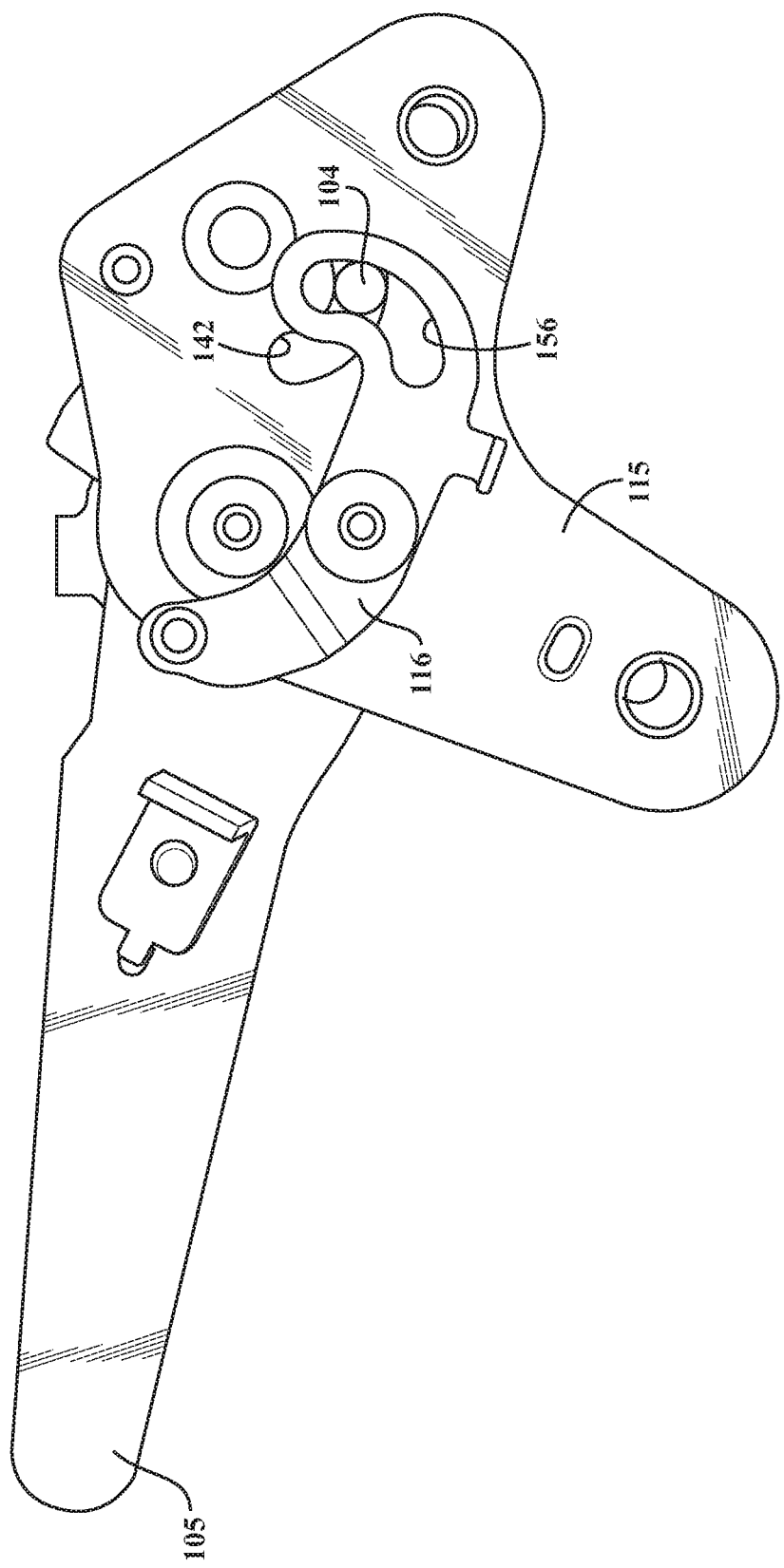

FIGS. 21-23 are a series of additional mockup plan views of the variant of FIG. 15 and corresponding to FIGS. 16-20. More specifically, the range of rotation of the cam release bracket 116 is shown guided by the cam release rivet 104 seated within each of the partially overlapping slots 142 (in the inner sector 115) and 156 in the bracket 116. In combination with the build of materials and plan views of FIGS. 16-20, the seatback can be manually retracted from the forward folded position of FIG. 20 to the upright design position of FIG. 16, with the pivot cam being reset into engagement with the seatback sector and shoulder.

Having described my invention, other and additional preferred embodiments will become apparent to those skilled in the art to which it pertains and without deviating from the scope of the appended claims.

I claim:

1. A seatback latch assembly integrated into an interface between a seatback pivotally supported to a seat bottom, said assembly comprising:
   a pair of floor supported stanchions defining a package receiving space therebetween;
   a seatback sector forming a portion of the seatback and which is pivotally secured between the stanchions within the package space for rotation between upright design and forward folded positions;
   a selected one of said floor supported stanchions further including a plurality of exteriorly disposed teeth, a gear drive plate being pivotally supported in the package space in stacked fashion with said seatback sector, said gear drive plate exhibiting a second plurality of exteriorly disposed teeth which overlap said first plurality of teeth;
   a cam pivotally supported within the package space between said stanchions and so that an abutment edge of said cam engages a shoulder location of said seatback sector in the upright design position; and
   said cam being influenced to a disengaged position, resulting in rotation of the seatback to the folded position.

2. The assembly as described in claim 1, further comprising a motor secured to said sector and including a pinion drive gear which engages said overlapping pluralities of teeth, said pinion gear rotating said gear plate a first rotational range in order to fold a remote situated headrest, continued rotation of said pinion gear driving said seatback sector along said first plurality of teeth to the folded position.

3. The assembly as described in claim 2, further comprising a cable extending from said gear drive plate such that, upon initial rotation of said plate by said pinion gear, a remote end of said cable in engagement with the headrest causing folding thereof.

4. The assembly as described in claim 1, further comprising an arcuate slot defined in said seatback sector, a pin extending between said stanchions and through said slot to define a range of rotation between the upright design and forward folded positions.

5. The assembly as described in claim 1, further comprising an elongated cam release bracket pivotally secured to an exterior surface of an inner spaced stanchion, a cable displaced actuation of a first extending end of said cam release bracket causing a second end of said release bracket, in engagement with said package space situated pivot cam, to actuate said pivot cam out of engagement with said seatback sector.

6. The assembly as described in claim 5, further comprising a clock spring supported about a main pivot established between said seatback sector and said outer stanchion plates for influencing the seatback to the forward folded position.

7. The assembly as described in claim 5, further comprising a pair of overlapping and arcuate slots configured within each of a selected stanchion plate and said elongated release bracket, a cam release pin extending from said package spaced situated pivoting cam and through said overlapping slots.

8. The assembly as described in claim 7, further comprising a torsion spring mounted over a pivot point of said cam release bracket for biasing said pivot cam to the upright design engaged position against said seat seatback sector.

9. A seatback latch assembly integrated into an interface between a seatback pivotally supported to a seat bottom, said assembly comprising:
   a pair of floor supported stanchions defining a package receiving space therebetween;
   a seatback sector forming a portion of the seatback and which is pivotally secured between the stanchions within the package space for rotation between upright design and forward folded positions;
   a selected one of said floor supported stanchions further including a plurality of exteriorly disposed teeth, a gear drive plate being pivotally supported in the package space in stacked fashion with said seatback sector, said gear drive plate exhibiting a second plurality of exteriorly disposed teeth which overlap said first plurality of teeth;
   a motor secured to said sector and including a pinion drive gear which engages said overlapping pluralities of teeth, said pinion gear rotating said gear plate a first rotational range in order to fold a remote situated headrest, continued rotation of said pinion gear driving said seatback sector along said first plurality of teeth to the folded position;
   a cable extending from said gear drive plate such that, upon initial rotation of said plate by said pinion gear, a remote end of said cable in engagement with the headrest causing folding thereof;
   a cam pivotally supported within the package space between said stanchions and so that an abutment edge of said cam engages a shoulder location of said seatback sector in the upright design position; and
   said cam being influenced to a disengaged position, resulting in rotation of the seatback to the folded position.

10. The assembly as described in claim 9, further comprising an arcuate slot defined in said seatback sector, a pin extending between said stanchions and through said slot to define a range of rotation between the upright design and forward folded positions.

11. The assembly as described in claim 9, further comprising an elongated cam release bracket pivotally secured to an exterior surface of an inner spaced stanchion, a cable displaced actuation of a first extending end of said cam release bracket causing a second end of said release bracket, in engagement with said package space situated pivot cam, to actuate said pivot cam out of engagement with said seatback sector.

12. The assembly as described in claim 11, further comprising a clock spring supported about a main pivot established between said seatback sector and said outer stanchion plates for influencing the seatback to the forward folded position.

13. The assembly as described in claim 11, further comprising a pair of overlapping and arcuate slots configured within each of a selected stanchion plate and said elongated release bracket, a cam release pin extending from said package spaced situated pivoting cam and through said overlapping slots.

14. The assembly as described in claim 13, further comprising a torsion spring mounted over a pivot point of said cam release bracket for biasing said pivot cam to the upright design engaged position against said seat seatback sector.

15. A seatback latch assembly integrated into an interface between a seatback pivotally supported to a seat bottom, said assembly comprising:
   a pair of floor supported stanchions defining a package receiving space therebetween;

a seatback sector forming a portion of the seatback and which is pivotally secured between the stanchions within the package space for rotation between upright design and forward folded positions;

an arcuate slot defined in said seatback sector, a pin extending between said stanchions and through said slot to define a range of rotation between the upright design and forward folded positions;

a cam pivotally supported within the package space between said stanchions and so that an abutment edge of said cam engages a shoulder location of said seatback sector in the upright design position; and an elongated cam release bracket pivotally secured to an exterior surface of an inner spaced stanchion, a cable displaced actuation of a first extending end of said cam release bracket causing a second end of said release bracket, in engagement with said package space situated pivot cam, to actuate said pivot cam out of engagement with said seatback sector to a disengaged position, resulting in rotation of the seatback to the folded position.

16. The assembly as described in claim 15, further comprising a clock spring supported about a main pivot established between said seatback sector and said outer stanchion plates for influencing the seatback to the forward folded position.

17. The assembly as described in claim 15, further comprising a pair of overlapping and arcuate slots configured within each of a selected stanchion plate and said elongated release bracket, a cam release pin extending from said package spaced situated pivoting cam and through said overlapping slots.

18. The assembly as described in claim 17, further comprising a torsion spring mounted over a pivot point of said cam release bracket for biasing said pivot cam to the upright design engaged position against said seat seatback sector.

* * * * *